US012769178B2

(12) United States Patent
Xu et al.

(10) Patent No.: US 12,769,178 B2
(45) Date of Patent: Oct. 20, 2026

(54) SYSTEM, METHOD AND CONFIGURATIONS PROVIDING COMPACT PHASE-MATCHED AND WAVEGUIDED NONLINEAR OPTICS IN ATOMICALLY LAYERED SEMICONDUCTORS

(71) Applicant: THE TRUSTEES OF COLUMBIA UNIVERSITY IN THE CITY OF NEW YORK, New York, NY (US)

(72) Inventors: Xinyi Xu, New York, NY (US); Chiara Trovatello, New York, NY (US); Fabian Mooshammer, New York, NY (US); Yinming Shao, New York, NY (US); Shuai Zhang, New York, NY (US); Kaiyuan Yao, New York, NY (US); Dmitri N. Basov, New York, NY (US); Giulio Cerullo, Milan (IT); P. James Schuck, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 18/227,249

(22) Filed: Jul. 27, 2023

(65) Prior Publication Data

US 2024/0036434 A1 Feb. 1, 2024

Related U.S. Application Data

(60) Provisional application No. 63/392,745, filed on Jul. 27, 2022.

(51) Int. Cl.

*G02F 1/355* (2006.01)
*G02F 1/35* (2006.01)
*G02F 1/37* (2006.01)

(52) U.S. Cl.

CPC ............ *G02F 1/3551* (2013.01); *G02F 1/353* (2013.01); *G02F 1/37* (2013.01)

(58) Field of Classification Search

CPC ........... G02F 1/353; G02F 1/3551; G02F 1/37
See application file for complete search history.

(56) References Cited

U.S. PATENT DOCUMENTS 9,513,532 B2 * 12/2016 Zhang ..................... G02F 1/355
9,785,033 B2 * 10/2017 Gattass ................. H01S 3/0092

OTHER PUBLICATIONS

Autere et al., "Optical harmonic generation in monolayer group-VI transition metal dichalcogenides", Phys. Rev. B 98, p. 115426-1 through p. 115426-7, Sep. 17, 2018, DOI: https://doi.org/10.1103/PhysRevB.98.115426. (Year: 2018).*

(Continued)

*Primary Examiner* — Daniel Petkovsek

(74) *Attorney, Agent, or Firm* — Hunton Andrews Kurth LLP

(57) ABSTRACT

Exemplary method and configuration for a frequency conversion can be provided. For example, such method and configuration can use at least one transition metal dichalcogenide (TDM) crystal (which can include one or more $MoS_2$ crystals, which can be stacked). For example, it is possible to providing at least one radiation to the at least one TDM crystal so as to generate a resultant radiation. Resultant information can be generated by measuring difference frequency and a second harmonic generation (SHG) from the resultant radiation provided from the TDM crystal. The frequency conversion can be obtained or achieved by providing a measurement of a SHG coherence length based on the resultant information.

17 Claims, 9 Drawing Sheets

(56) References Cited

OTHER PUBLICATIONS

Ono, M. et al. "Ultrafast and energy-efficient all-optical switching with graphene-loaded deep-subwavelength plasmonic waveguides," Nat. Photonics 14, 37-43 (2020).
Li, C. Nonlinear optics: Principles and applications. (Springer Singapore, 2016).
Klimmer, S.et al. "All-optical polarization and amplitude modulation of second-harmonic generation in atomically thin semiconductors," Nat. Photon. (2021).
Sun, Z., et al. "Optical modulators with 2D layered materials," Nat. Photonics 10 227-238 (2016).
Yao, K. et al. "Enhanced tunable second harmonic generation from twistable interfaces and vertical superlattices in boron nitride homostructures." Sci. Adv 7, eabe8691 (2021).
Ehren M. et al. "Ultrafast Electronic and Structural Response of Monolayer MoS2 under Intense Photoexcitation Conditions." ACS Nano 8, 10734-10742 (2014).
Ghazal H. et al. "Single Nanoflake Hexagonal Boron Nitride Harmonic Generation with Ul-tralow Pump Power," ACS Photonics 8, 1922-1926( 2021).
Dinparasti Saleh, H. et al. "Towards spontaneous parametric down conversion from monolayer MoS2," Sci. Rep. 8, 3862(2018).
Wang, Y., et al. "Integrated photon-pair sources with nonlinear optics," Applied Physics Reviews 8, 011314(2021).
Caspani, L. et al. "Integrated sources of photon quantum states based on nonlinear optics," Light: Science and Applications 6, e17100 (2017).
Lin, KQ., et al. "Quantum interference in second-harmonic generation from monolayer WSe2," Nat. Phys. 15, 242-246 (2019).
Yao, K. et al. "Continuous Wave Sum Frequency Generation and Imaging of Monolayer and Heterobilayer Two-Dimensional Semiconductors," ACS Nano 14, 708-714 (2020).
Chen, H. et al. "Enhanced second-harmonic generation from two-dimensional MoSe2 on a silicon waveguide," Light: Science and Applications 6, e17060 (2017).
Trovatello, C. et al. "Optical parametric amplification by monolayer transition metal dichalcogenides," Nat. Photonics 15, 6-10 (2021).
Wu, L. et al. "Giant anisotropic nonlinear optical response in transition metal monopnictide Weyl semimetals," Nat. Physics 13, 350-355 (2017).
Li, Y. et al. "Probing symmetry properties of few-layer MoS2 and h-BN by optical second-harmonic generation," Nano Letters 13, 3329-3333 (2013).
Malard, L. M., et al. "Observation of intense second harmonic generation from MoS2 atomic crystals," Phys. Rev. B 87, 1-5 (2013).
Wang G, et al. "Giant enhancement of the optical second-harmonic emission of WSe 2 monolayers by laser excitation at exciton resonances," Physical review letters 114, 097403 (2015).
Nagler, P. et al. "Giant magnetic splitting inducing near-unity valley polarization in van der Waals heterostructures," Nat. Commun. 8, 1551 (2017).
Mennel, L. et al. "Optical imaging of strain in two-dimensional crystals," Nat. Commun. 9, 516(2018).
Robert W. Boyd "Nonlinear optics," Fourth Edition (Academic Press, 2020).
Hsu, W.-T. et al. "Second Harmonic Generation from Artificially Stacked Transition Metal Dichalcogenide Twisted Bilayers;" ACS Nano 8, 2951-2958 (2014).
Liu, F. et al. "Disassembling 2D van der Waals crystals into macroscopic monolayers and reassembling into artificial lattices," Science 376, 903-906 (2020).
Wang, Q., et al. "Electronics and optoelectronics of two-dimensional transition metal dichalcogenides," Nat. Nanotech 7, 699-712 (2012).
Saynatjoki, A., et al. "Ultra-strong nonlinear optical processes and trigonal warping in MoS2 layers," Nat Commun 8, 893 (2017).
Shi, J. et al. "3R MoS2 with Broken Inversion Symmetry: A Promising Ultrathin Nonlinear Optical Device," Adv. Mater. 29, 1701486 (2017).
Zhao, M. et al. Atomically phase-matched second-harmonic generation in a 2D crystal. Light: Science and Applications 5, e16131 (2016).
Song, B. et al. "Layer-Dependent Dielectric Function of Wafer-Scale 2D MoS2," Adv. Optical Mater. 7, 1801250 (2019).
Ermolaev, G. A. et al. "Giant optical anisotropy in transition metal dichalcogenides for next-generation photonics," Nat. Commun. 12, 854 (2021).
Chanyoung Yim et al. "Investigation of the optical properties of MoS2 thin films using spec-troscopic ellipsometry," Appl. Phys. Lett. 104, 103114 (2014).
Cai, L., et al. "Highly efficient broadband second harmonic generation mediated by mode hybridization and nonlinearity patterning in compact fiber-integrated lithium niobate nano-waveguides," Sci. Rep. 8, 12478 (2018).
Shoji, I., et al. "Absolute scale of second-order nonlinear-optical coefficients," J. Opt. Soc. Am. B 14, 2268-2294 (1997).
Liu, W. et al. "Strong Exciton-Plasmon Coupling in MoS2 Coupled with Plasmonic Lattice," Nano Letters 16, 1262-1269 (2016).
Vaquero, D. et al. "Excitons, trions and Rydberg states in monolayer MoS2 revealed by low-temperature photocurrent spectroscopy," Communications Physics 3, 194 (2020).
Hu, D. et al. "Probing optical anisotropy of nanometer-thin van der waals microcrystals by near-field imaging," Nat. Commun. 8, 1471 (2017).
Sternbach, A. J. et al. "Femtosecond exciton dynamics in WSe2 optical waveguides," Nat. Commun. 11, 3567 (2020).
P. Kusch, et al., "Strong light-matter coupling in MoS2," Phys. Rev. B 103, 235409 (2021).
M. Mrejen, et al., "Transient exciton-polariton dynamics in WSe2 by ultrafast near-field imaging," Sci. Adv. 5, (2019).
Z. Li, et al. "High-Quality All-Inorganic Perovskite CsPbBr 3 Microsheet Crystals as Low-Loss Subwavelength Exciton-Polariton Waveguides," Nano Letters 21, 1822-1830 (2021).
F. Hu, et al., "Recent Progress on Exciton Polaritons in Layered Transition-Metal Dichalcogenides," Adv. Optical Mater. 8, 1901003 (2020).
X. Chen, et al.,"Modern Scattering-Type Scanning Near-Field Optical Microscopy for Advanced Material Research," Adv. Mater. 31, 1804774 (2019).
F. Hu, et al., "Imaging propagative exciton polaritons in atomically thin WSe2 waveguides," Phys. Rev. B 100, 121301 (2019).
N.C. Passler, et al., "Generalized 4×4 matrix formalism for light propagation in anisotropic stratified media: study of surface phonon polaritons in polar dielectric heterostructures," Journal of the Optical Society of America B 34, 2128 (2017).
J. Thomas, et al. "Quasi phase matching in femtosecond pulse volume structured x-cut lithium niobate," Laser and Photonics Reviews 7, L17-L20 (2013).
A. Bruch, et al. "17 000 %W second-harmonic conversion efficiency in single-crystalline aluminum nitride microresonators," Applied Physics Letters 113, (2018).
N. Ocelic, et al., "Pseudoheterodyne detection for background-free near-field spectroscopy," Applied Physics Letters 89, 101124 (2006).
S. Zhang, et al. "Nano-spectroscopy of excitons in atomically thin transition metal dichalcogenides," Nat. Commun. 13, 542 (2022).
D. Hu, et al. "Tunable Modal Birefringence in a Low-Loss Van Der Waals Waveguide," Adv. Mater. 31, 1807788 (2019).
I.H. Malitson, "Interspecimen Comparison of the Refractive Index of Fused Silica," J. Opt. Soc. Am., JOSA 55, 1205-1209 (1965).
Harland Tompkins, Eugene A Irene Handbook of Ellipsometry (William Andrew, 2005).

* cited by examiner

100

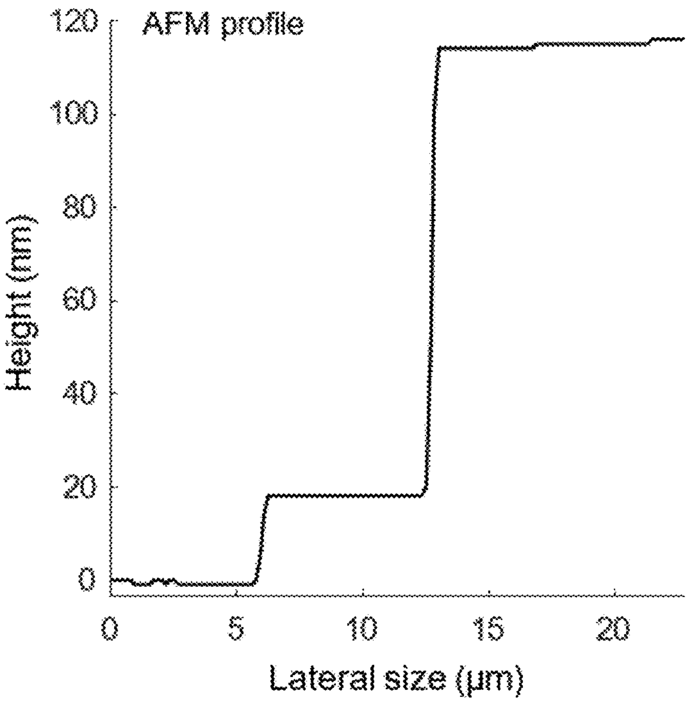
Figure 1d
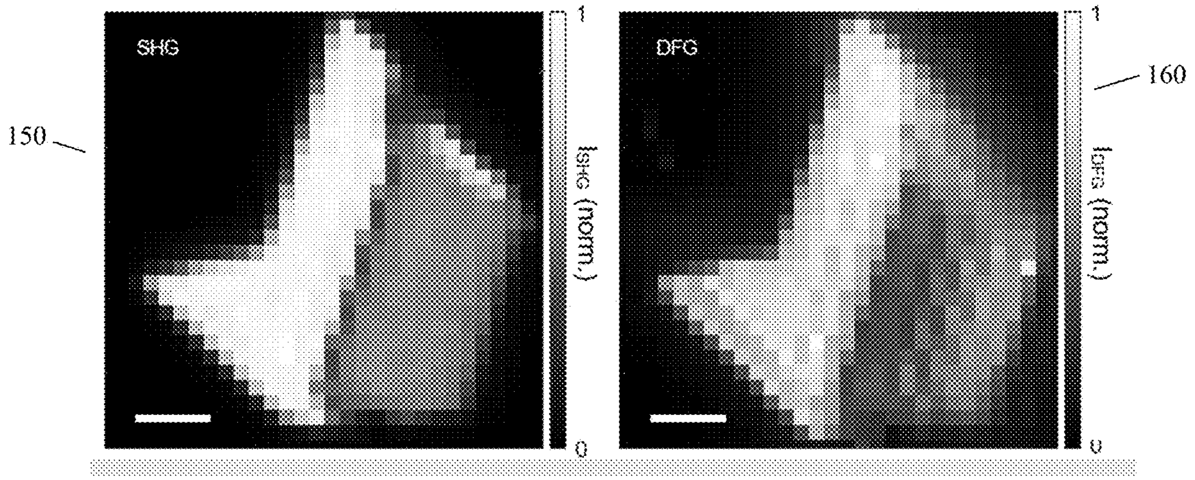
Figure 1e
Figure 1f

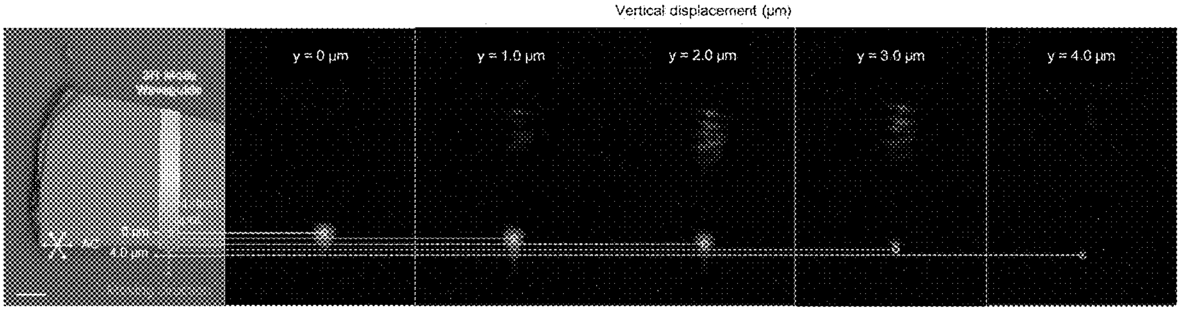
Figure 4a
Figure 4b
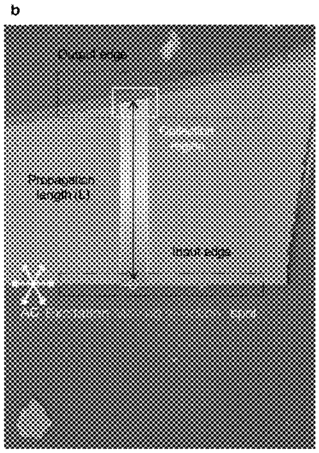
Figure 4d
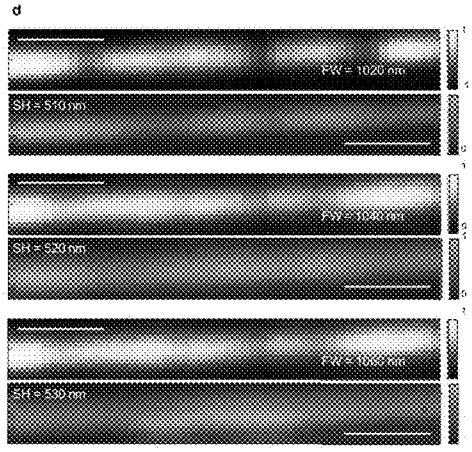
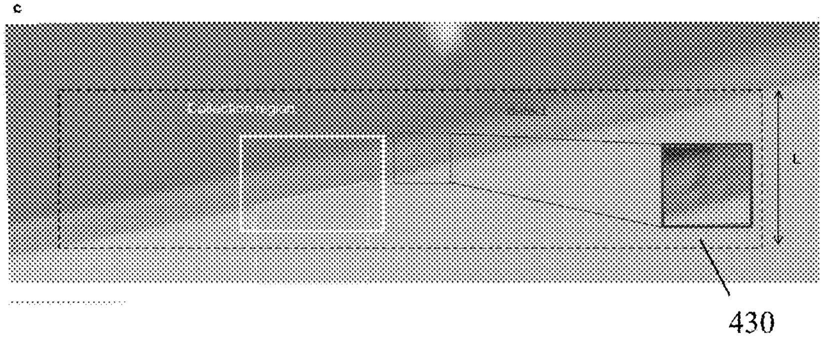
Figure 4c

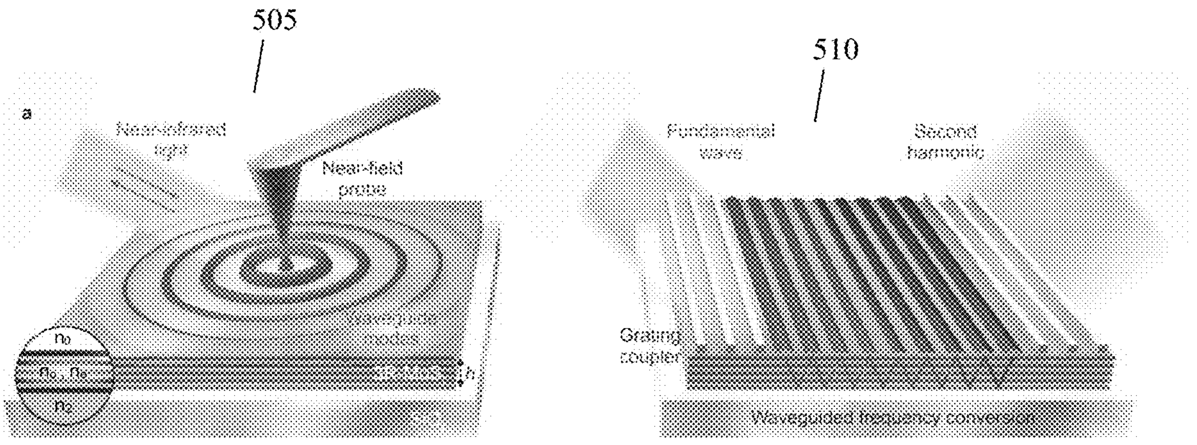
Figure 5a
Figure 5b
Figure 5c
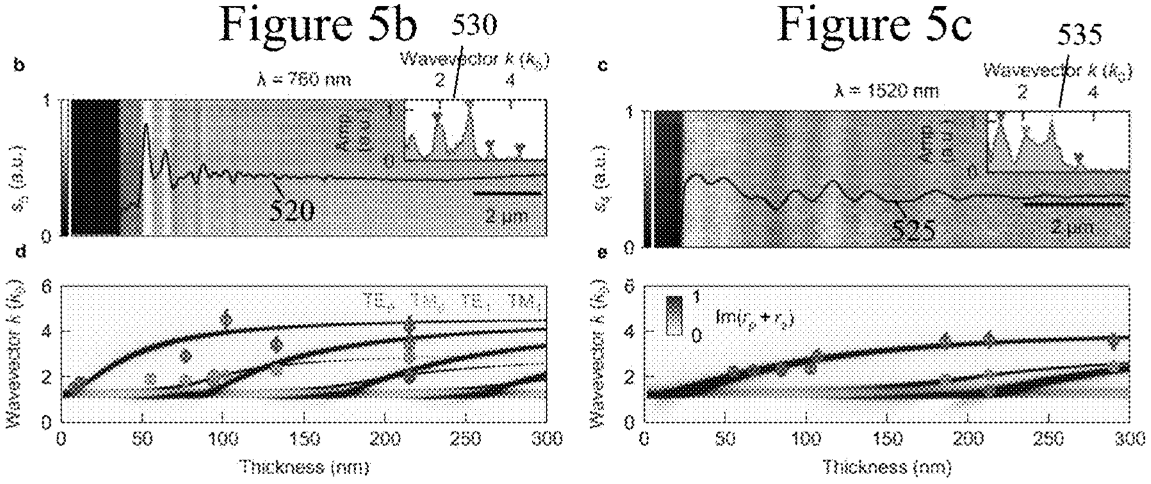
Figure 5d
Figure 5e
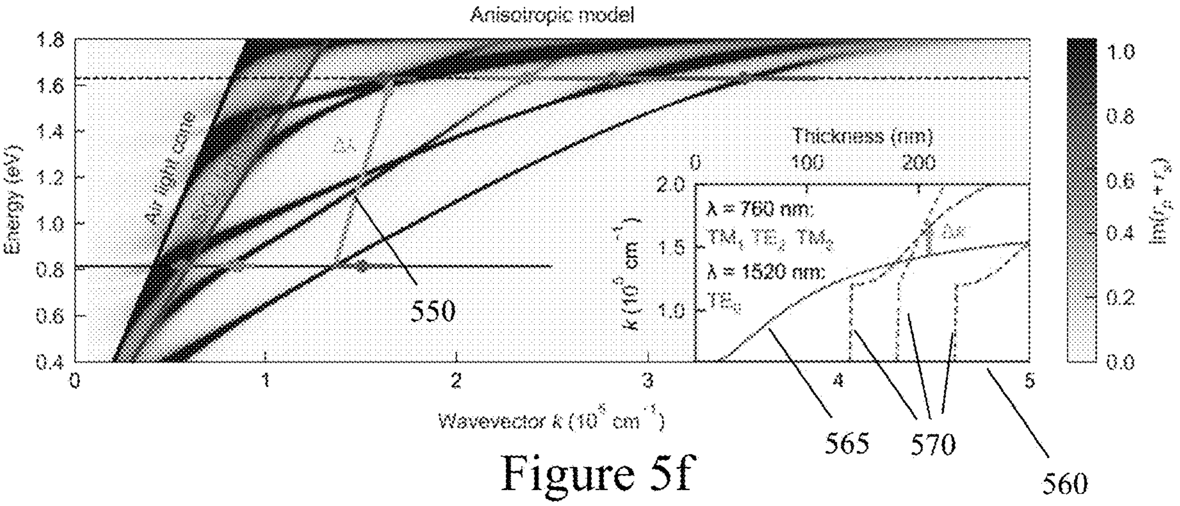
Figure 5f

SYSTEM, METHOD AND CONFIGURATIONS PROVIDING COMPACT PHASE-MATCHED AND WAVEGUIDED NONLINEAR OPTICS IN ATOMICALLY LAYERED SEMICONDUCTORS

CROSS REFERENCE TO RELATED APPLICATION(S)

This application relates to and claims priority from U.S. Provisional Patent Application Ser. No. 63/392,745, filed Jul. 27, 2023, the disclosure of which is incorporated herein by reference in its entirety.

STATEMENT REGARDING FEDERALLY FUNDED RESEARCH

This invention was made with government support under Grant no. DE-SC0019443 awarded by the U.S. Department of Energy. The government has certain rights in this invention.

BACKGROUND INFORMATION

Nonlinear optics are used in light generation and manipulation. Coherent frequency conversion, such as second- and third-harmonic generation, parametric light amplification and down-conversion, facilitates a deterministic change in wavelength as well as control of temporal and polarization properties. When integrated within photonic chips, nonlinear optical materials constitute the basic building blocks for all-optical switching [see, e.g., Refs. 1-3], light modulators [see, e.g., Refs. 4-7], photon entanglement[8, 9] and optical quantum information processing [see, e.g., Refs. 10 and 11]. Conventional nonlinear optical crystals display moderate second-order nonlinear susceptibilities ($|\chi^{(2)}|$~1-30 pm/V) and perform well in benchtop setups with discrete optical components. However, such crystals do not easily lend themselves to miniaturization and on-chip integration. Two-dimensional transition metal dichalcogenides (TMDs) possess huge nonlinear susceptibilities [see, e.g., Ref 12] ($|\chi^{(2)}$ ~100-1000 pm/V) and, thanks to their deeply sub-wavelength thickness, offer a unique platform for on-chip nonlinear frequency conversion [see, e.g., Ref 13] and light amplification [see, e.g., Ref 14]. Furthermore, their semiconducting properties render TMDs superior for applications compared to opaque materials with very large $|\chi^{(2)}|$ such as Weyl semimetals [see, e.g., Ref 15].

In single- or few-layer TMD samples, SHG is extensively exploited for characterization of structural properties such as crystal orientation [see, e.g., Refs. 16-19] or local strain [see, e.g., Ref 20]. However, due to their atomic thickness, these samples display a notably lower SHG efficiency ($\eta_{SHG}=I_{2\omega}/I_{\omega}\sim10^{-11}$ at $I_{\omega}$=30 GW/cm$^2$) compared to standard nonlinear crystals ($\eta_{SHG}=I_{2\omega}/I_{\omega}$~1-50%). The SHG efficiency can be written as [see, e.g., Ref 21]: $\eta_{SHG}\propto|\chi^{(2)}|^2L^2$, where L is the thickness of the nonlinear medium (assuming perfect phase matching and non-depletion regime). The nonlinear conversion efficiency of a TMD can thus be scaled by increasing the propagation length L through the active medium. This is attainable by increasing the number of layers in the TMD sample. However, the nonlinear optical properties of multilayer TMDs critically depend on their crystallographic symmetry [see, e.g., Ref. 23].

Group VI trigonal TMDs (e.g. $MoS_2$) can be stable in two crystallographic phases: polytype 2H (hexagonal) and polytype 3R (rhombohedral) [see, e.g., Ref. 24]. 2H—$MoS_2$ is naturally centrosymmetric, giving an opposite dipole orientation among consecutive layers. This results in a vanishing nonlinear susceptibility ($|\chi^{(2)}|=0$) for crystals with even number of layers [see, e.g., Refs. 16 and 25] and precludes efficient conversion in multilayer 2H-TMDs. To circumvent this limitation—and restore the quadratic scaling of the nonlinear conversion efficiency with the number of layers N ($I_{2\omega}/I_{\omega}\propto N^2$)—one can artificially AA stack several monolay and [see, e.g., Ref. 23], aligning their dipole moments [see, e.g., Refs. 21 and 22]. Although the mechanically assembled stacks can provide proof of concept for fundamental studies, their labor-intensive fabrication can prevent a massive large-scale production.

In contrast, 3R—$MoS_2$ is naturally non-centrosymmetric. The optical emission from consecutive in-plane nonlinear dipoles of 3R—$MoS_2$ results in a constructive interference, prompting the $N^2$ enhancement of the nonlinear conversion efficiency [see, e.g., Refs. 14 and23] for thin samples. Similar to 2H—$MoS_2$, bulk 3R—$MoS_2$ can be grown by chemical vapor transport (CVT) [see, e.g., Ref. 26]and thin 3R—$MoS_2$ flakes can be obtained by dry mechanical exfoliation. The nonlinear optical response of 3R—$MoS_2$ has been explored in some recent pioneering studies, so far focusing on thinner crystals, reporting the $N^2$ enhancement at the 2D limit, and showing a maximum SHG enhancement of ~$10^2$ occurring at specific thickness windows [see, e.g., Refs. 26 and 27]. Pushing towards general application, however, requires higher nonlinear enhancements and thus larger N, which in turn leads to more intricate interferences and interactions within the crystal. Specifically, for multilayer TMDs, the wavevector mismatch between the fundamental wave-length (FW) and the second harmonic (SH) needs to be considered, as it limits the maximum propagation length for constructive interference. In addition, thick 3R—$MoS_2$ crystals act as Fabry-Perot cavities, which modulate the FW power inside the sample. The combination of these effects determines the optimum thickness of 3R—$MoS_2$ for the highest SHG conversion efficiency. Due to their layered nature, 3R-stacked TMDs are also naturally anisotropic, and thus birefringent—a key prerequisite for achieving perfect phase-matching.

Accordingly, there may be a need to address and/or at least partially overcome at least some of the prior deficiencies described herein.

SUMMARY OF EXEMPLARY EMBODIMENTS

Such issues and/or deficiencies can at least be partially addressed and/or overcome with the exemplary embodiments of the present disclosure.

For example, it is possible to measure SHG and difference frequency generation (DFG) from multilayer 3R—$MoS_2$ crystals with variable thickness, using a custom transmittance microscope to determine the maximum enhancement of nonlinear conversion efficiency, revealing the intrinsic upper limits of the material. According to exemplary embodiments of the present disclosure, it is possible to provide a comprehensive model, method and configuration, which can facilitate the second-order nonlinearity of 3R—$MoS_2$ including its phase mismatch and its intrinsic interference effects. To that end, the first measurement of the coherence length L, of 3R—$MoS_2$ can be provided, which can elucidate the role of phase-matching at excitation photon energies close to the telecom band. In addition, according to exemplary embodiments of the present disclosure, e.g., 3R—$MoS_2$ can facilitate a broadband SH conversion in waveguide geometries. Upon edge coupling of the FW, it is possible to detect and map both FW and SH emission from the opposite edge of the flake within the field of view. The characteristic SHG signal modulation can be provided with increasing path length, facilitating to quantify the out-of-plane coherence length in 3R waveguide structures. Further, it is also possible to characterize the anisotropic linear optical properties by imaging the propagation of waveguide modes in real space using near-field nano-imaging, identifying the conditions for phase-matched SHG in waveguide geometries. Together, these findings can achieve birefringent phase matching in waveguides of van der Waals (vdW) semiconductors, directly impacting the field of vdW photonics by enabling future advances in conversion efficiencies and integration.

While previous studies of 3R-TMDs have focused on ultra-thin samples, according to the exemplary embodiments of the present disclosure, first measurement of the coherence length Lc in this material can be provided, and record nonlinear optical signal enhancements and conversion efficiencies (difference frequency generation (DFG) and SHG) demonstrate at telecom wavelengths, which can be critical for real device development and applications. An exemplary unified and comprehensive model can be provided explaining the complex thickness dependence of second-order nonlinearity $\chi(2)$ of 3R—$MoS_2$ including its intrinsic phase-mismatch and interference effects. Further, using near-field nano-imaging, it is possible to characterize the birefringent refractive index spectrum, measure its optical anisotropy for the first time, and image the propagation of waveguide modes in real space, identifying the conditions for phase-matched $\chi(2)$ engineering in waveguide geometries.

It is possible to realize the potential of 3R-stacked TMDs for integrated photonics, providing the roadmap for designing highly efficient on-chip nonlinear optical devices including periodically poled structures, resonators, compact optical parametric oscillators and amplifiers, and optical quantum circuits.

According to various exemplary embodiments of the present disclosure, it is possible to 1) Record nonlinear optical enhancement from a van der Waals material, e.g., greater than 104 times a monolayer.

Empowered by the fundamental material and nonlinear optical properties describe herein, it is possible to demonstrate nonlinear conversion efficiencies at telecom wavelengths that are 10× larger than those recently reported in hybrid quantum dot/TMD systems [see, e.g., Nature Photonics 15, 510 (2021)] and 100× than observed in previous 3R-TMD studies [see, e.g., Advanced Materials 29, 1701486 (2017)].

2) Greater than 100× larger nonlinear conversion efficiency density $\eta$ than LiNbO3 and other commercially-used nonlinear crystals Using the exemplary measured material parameters, it is possible to show $\eta$=71800% $W^{-1}cm^{-2}$ in 3R—$MoS^2$ for L=622 nm, while $\eta$=460% $W^{-1}cm^{-2}$ for LiNbO3 on an insulator waveguide with 50 μm propagation length. Importantly, this can mean 3R—$MoS^2$ achieves similar conversion efficiencies with two orders of magnitude shorter propagation lengths.

3) The first measure of the coherence length Lc and full refractive index spectrum for a 3R-TMD The nonlinear coherence length is critical for all future nonlinear optical device designs utilizing the material, representing the length scale at which destructive interference sets in, limiting the conversion efficiency. It can be the key parameter for optimizing nonlinear frequency conversion and engineering all quasi-phase-matched architectures.

4) Reveal and quantify the anisotropic dielectric tensor of 3R—MoS2 and demonstrate low-loss waveguiding using near-field nano-imaging.

The measured low-loss anisotropy provides a viable strategy for increasing SHG and DFG efficiency (including quantum entanglement via parametric down conversion) by significantly extending propagation lengths in thin crystals to multi-micrometer scales using waveguide geometries. These important properties can facilitate ultra-compact efficient devices, opening frontiers for on-chip integrated nonlinear periodically poled structures, photonic resonators, and optical quantum circuits.

In summary, the exemplary results according to the exemplary embodiments of the present disclosure can provide a significant advance towards the expansion of van der Waals materials in next-generation nonlinear photonic architectures, with 3R-stacked TMD crystals representing ideal candidates for boosting nonlinear optical gain with minimal footprint—and for replacing current bulk and periodically poled crystals. Such exemplary embodiments can have an immediate impact in diverse areas spanning on-chip tunable lasers to quantum communications.

To that end, exemplary method and configuration according to the exemplary embodiments of the present disclosure can be provided for a frequency conversion. For example, such method and configuration can use at least one transition metal dichalcogenide (TDM) crystal (which can include one or more $MoS_2$ crystals, which can be stacked, multilayered and/or non-centrosymmetric). For example, it is possible to providing at least one radiation to the at least one TDM crystal so as to generate a resultant radiation. Resultant information can be generated by measuring difference frequency and a second harmonic generation (SHG) from the resultant radiation provided from the TDM crystal. The frequency conversion can be obtained or achieved by providing a measurement of a SHG coherence length based on the resultant information. The frequency conversion can be non-linear.

According to additional exemplary embodiments of the present disclosure, it is possible to characterize a substantially full refractive index spectrum of the resultant radiation. It is also possible to quantify birefringence components in the at least one 3R-stacked TDM crystal with near-field nano-imaging. The measurement of the difference frequency and the SHG can include measuring a coherent light from the resultant radiation provided from the TDM crystal. In addition or alternatively, the measurement of the SHG coherence length can be based on a thickness of the TDM crystal. The measurement can be based on the thickness and a second-order nonlinearity of the TDM crystal. The second order non-linearity can include an intrinsic phase-mismatch and interference effects of the TDM crystal.

In a further exemplary embodiment of the present disclosure, it is possible, using near-field nano-imaging, to characterize a birefringent refractive index spectrum of the resultant radiation, and measure an optical anisotropy of the birefringent refractive index spectrum. In addition or alternatively, it is also possible to, using near-field nano-imaging, image a propagation of waveguide modes of the resultant radiation in real space, and identify a conditions for phase-matched components in optical geometries. The measurement of the SHG coherence length can include measuring a non-linear coherence length of the resultant radiation. The TDM crystal can includes at least one flake, and it is possible to detect and map the resultant radiation which is fundamental wave-length (FW) emission and a second harmonic (SH) emission from an opposite edge of the flake within a field of view. The detection can be performed using a detector.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 1*a*-1*f* are a set of configuration diagrams, illustrations and graphs regarding the SHG and DFG emission from $_3$R—$MoS_2$, according to exemplary embodiments of the present disclosure;

FIGS. 4*a-e* are a set of illustrations, images and graphs associated with out-of-plane SHG coherence length in waveguide geometry, according to exemplary embodiments of the present disclosure; and FIGS. 5*a*-5*f* are a set of configuration diagrams, illustrations, graphs and intensity maps which can be used for accessing the dispersion of waveguide modes (WMs) in $_3$R—$MoS_2$ via nano-imaging, according to exemplary embodiments of the present disclosure.

Figure 1A:
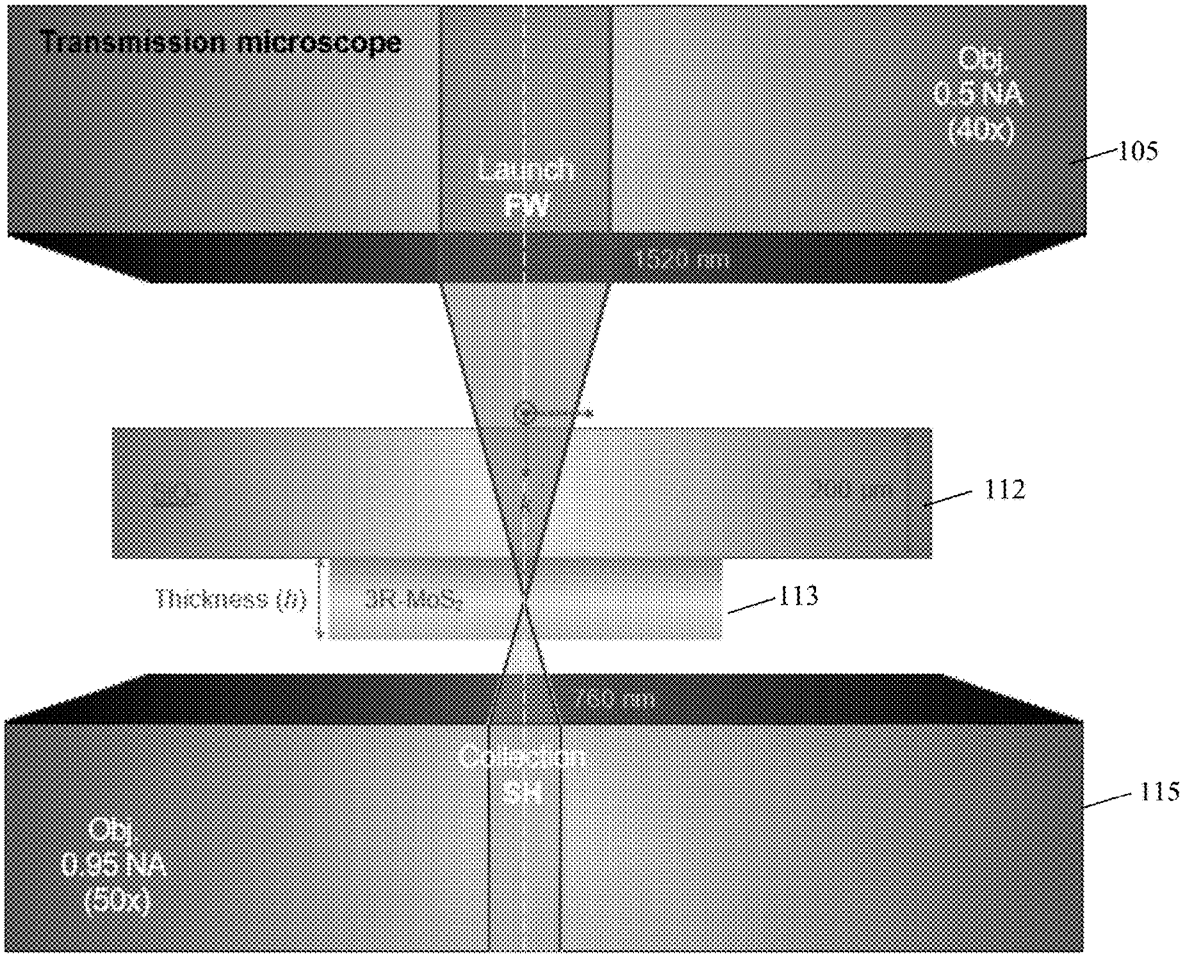

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

According to exemplary embodiments of the present disclosure, it is possible to utilize, e.g., a custom transmission microscope (as described herein and shown in FIG. 1*a*) to measure SHG and DFG from the multilayer 3R—$MoS_2$ flakes with tunable thickness h. The 3R—$MoS_2$ microcrystals are mechanically exfoliated from a commercial CVT-grown bulk 3R—$MoS_2$ crystal (HQ graphene) onto a 200 μm thick fused silica ($SiO_2$) substrate. The bulk sample has been characterized by energy dispersive X-ray analysis (EDX) and X-Ray diffraction (XRD). The thickness of each exfoliated flake has been determined by atomic force microscopy (AFM), The detection objective has a larger numerical aperture (NA) than the excitation one to maximize signal collection from scattering at larger angles.

FIG. 1*a* illustrates a schematic diagram of a transmittance microscope 100 according to an exemplary embodiment of the present disclosure. For example, excitation of 3R—$MoS_2$ with thickness h is through a 40× reflective objective 105 (NA=0.5) and the nonlinear emission can be collected by a 50× objective 110 (NA=0.95). The sample can be exfoliated on a transparent thick $SiO_2$ substrate 112 having a thickness of about 200 μm.

Figure 1B:
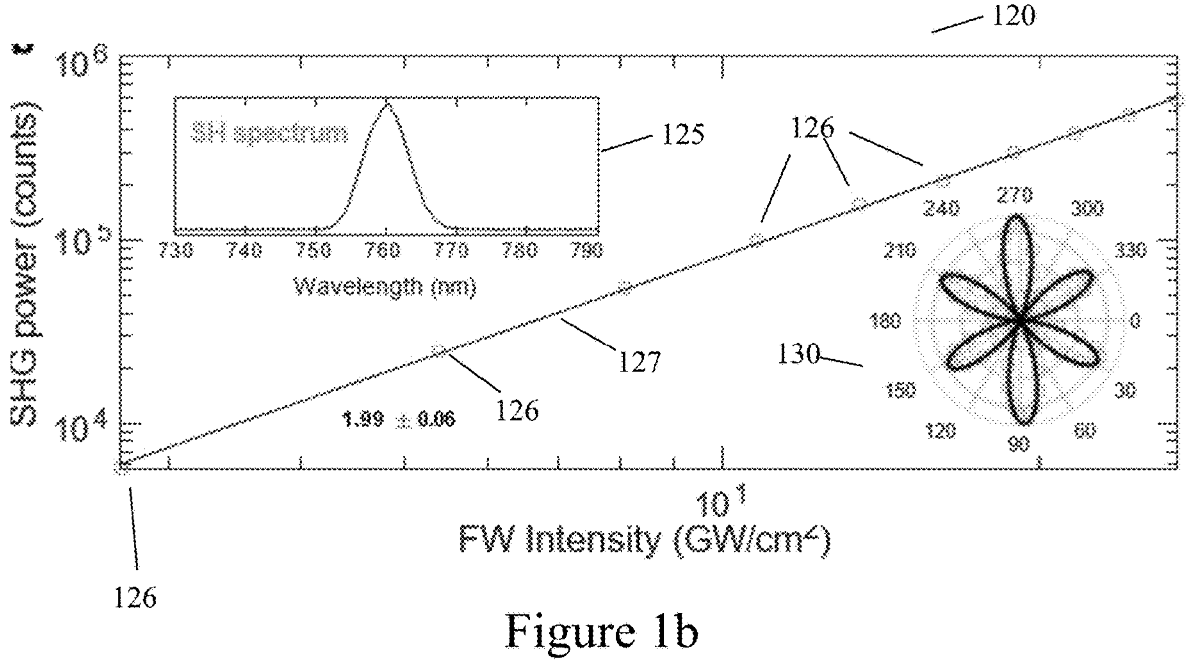

FIG. 1*b* shows a graph 120 of SH intensity as a function of FW power, according to exemplary embodiments of the present disclosure. For example, insets: (top left) representative SH spectrum 125, (top down) polar plot 130 of the armchair directions. In particular, the graph of FIG. 1*b* illustrates an exemplary power-dependent SHG measured on about 119 nm thick 3R—$MoS_2$ (dots 126) and the fitted power law (line 127). The pump wavelength can be set to 1520 nm (0.815 eV) yielding SHG centered at about 760 nm (e.g., 1.63 eV) (with inset shown for a representative spectrum). The SHG emission can follow the expected quadratic power dependence.

The saturation regime can be beyond the maximum excitation power that it is possible to achieve at the focus in the exemplary embodiment of the present disclosure, e.g., ~45 mW, corresponding to an intensity of ~120 GW/$cm^2$. Moreover, since both FW and SH are tuned below the bandgap of 3R—$MoS_2$, the material is essentially transparent, and no appreciable degradation of the sample is detected. This highlights the potential to boost the nonlinear conversion efficiency at higher intensities. Due to damage considerations, such intensities are usually unattainable in the absorptive above-gap regime, where excitonic resonances are exploited to enhance the nonlinear response of TMDs [see, e.g., Refs. 12 and 18]. A representative 6-lobed polarization-dependent SHG flower pattern [see, e.g., Refs.17] (as shown in inset 125 of FIG. 1*b*), in which the pump polarization is rotated by a half-wave plate, and the transmission axis of the detection polarizer is kept parallel to the pump, reflects the $D_{6h}$ point group of the 3R crystal with broken inversion symmetry. It shows two longer lobes along one of the armchair directions, attributable to the staggered stacking direction [see, e.g., Ref 26].

Figure 1C:
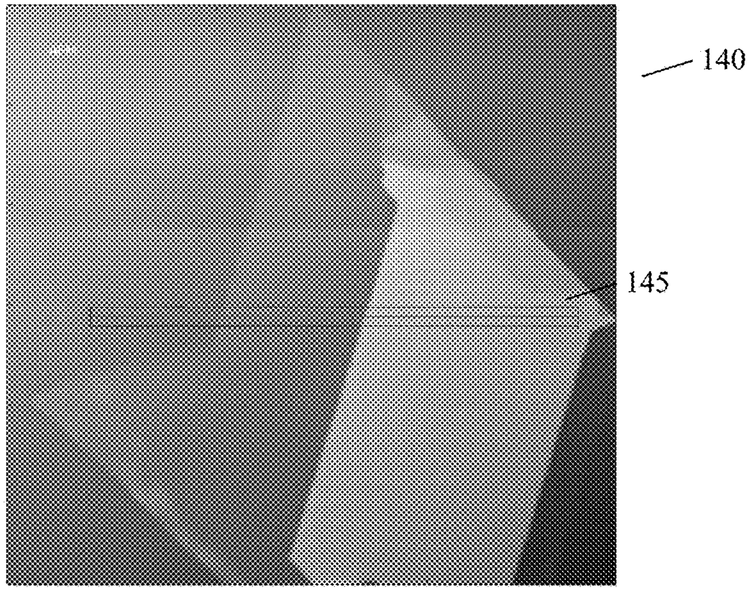

FIG. 1*c* shows an exemplary AFM image 140 of a representative 3R—$MoS_2$ flake, according to an exemplary embodiment of the present disclosure, along with a line 145 cut of the height profile in which it is possible to distinguish the flack of two flat uniform regions of 20 nm and 119 nm thickness, as provided in FIG. 1*d*, which illustrates AFM profile of the marked region.

FIG. 1*e* illustrates an exemplary normalized SHG map 150 at 1.63 eV. The FW photon energy is about 0.815 eV. At each data point the pump power is kept constant at 5.4 mW and the linear pump polarization is parallel to the armchair direction. FIG. 1*f* shows an exemplary normalized DFG map 160 at 2.16 eV. The pump photon energy is about 3.11 eV and the signal photon energy is 0.95 eV. At each data point, the pump and the signal powers can be 121 μW and 93 mW between the maps 150 and 160, respectively. The pump and signal have the same linear polarization, parallel to the armchair direction. The scale bar is about 5 μm.

According to an exemplary embodiment of the present disclosure, a sample-scanning confocal modality can be used for mapping the spatially dependent SHG and DFG intensities over the flake (see FIGS. 1*e* and 1*f*, respectively). The SHG (FW at 1520 nm, 0.815 eV) of FIG. 1*e* can be measured with the pump polarization and the collection analyzer directions parallel to the armchair direction with the largest nonlinear response. As shown in the exemplary graph of FIG. 1*e*, the 20 nm thick region displays an SHG intensity twice as large as the one obtained on a 119 nm thick flake. In other words, by increasing the thickness of the 3R—$MoS_2$ flake, the emitted SHG decreases. Since both FW and SH photon energies lie below the direct optical bandgap (~1.85 eV), this effect would not be attributed to absorption (indirect absorption losses are negligible for these wavelengths and thicknesses (see FIG. 2*c*).

The DFG map at about 574 nm (~2.16 eV), shown in the exemplary graph of FIG. 1*f*, can be recorded on the same flake using a pump wavelength of about 400 nm (~3.11 eV) and a signal at about 1300 nm (~0.95 eV). The pump and signal beams can have parallel polarizations, while the collection is unpolarized. For example, similarly to the SHG of FIG. 1*e*, the thicker area in FIG. 1*f* has weaker DFG signal than the thinner area. Considering that both pump and idler photon energies lie above the optical gap, it is possible to estimate that the absorption is the main reason for measured weaker idler intensity in this case. Indeed, it may not be possible to detect any idler signal through a 622 nm thick 3R—$MoS_2$ flake.

To understand the thickness-dependence of the SHG efficiency, both interference and phase-matching effects can be taken into account. For example, the light propagation in the nonlinear medium can be analyzed using, e.g., the transfer matrix method (TMM), modeling the exemplary structure as a 3-layer system $SiO_2/MoS_2$/air with refractive indexes $n_0/n_1/n_2$. The transmissivity of the FW light can change periodically with the sample thickness h as:

$$T_{\omega}(h) = \frac{\mathrm{Re}\{n_2\} | t_{01} t_{12} |^2}{\mathrm{Re}\{n_0\} | e^{jk_1 h} + r_{01} r_{12} e^{-jk_1 h} |} \qquad (1)$$

where $n_i$ is the refractive index of each layer, $t_{ij}$ and $r_{ij}$ are the transmissivity and reflectivity coefficients from layer i to layer j, k is the wavevector, and h is the thickness of the 3R—$MoS_2$ layer. The effective FW intensity at the sample can be $I_{\omega,s}=T_{\omega}(h)I_{\omega,in}$ where $I_{\omega,in}$ is the FW intensity after the focusing objective, which can be maintained as fixed during the experiment. Due to interference effects, the effective power flux across the sample can change periodically along with the thickness (see line 205 of FIG. 2*a*). In particular, FIG. 2*a* shows an exemplary graph 200 for a calculated pump transmissivity (line 205) and phase-mismatch curve (line 210) as a function of the 3R—MoS2 thickness, according to an exemplary embodiment of the present disclosure.

Figures 2A, 2B, 2C, 2D:
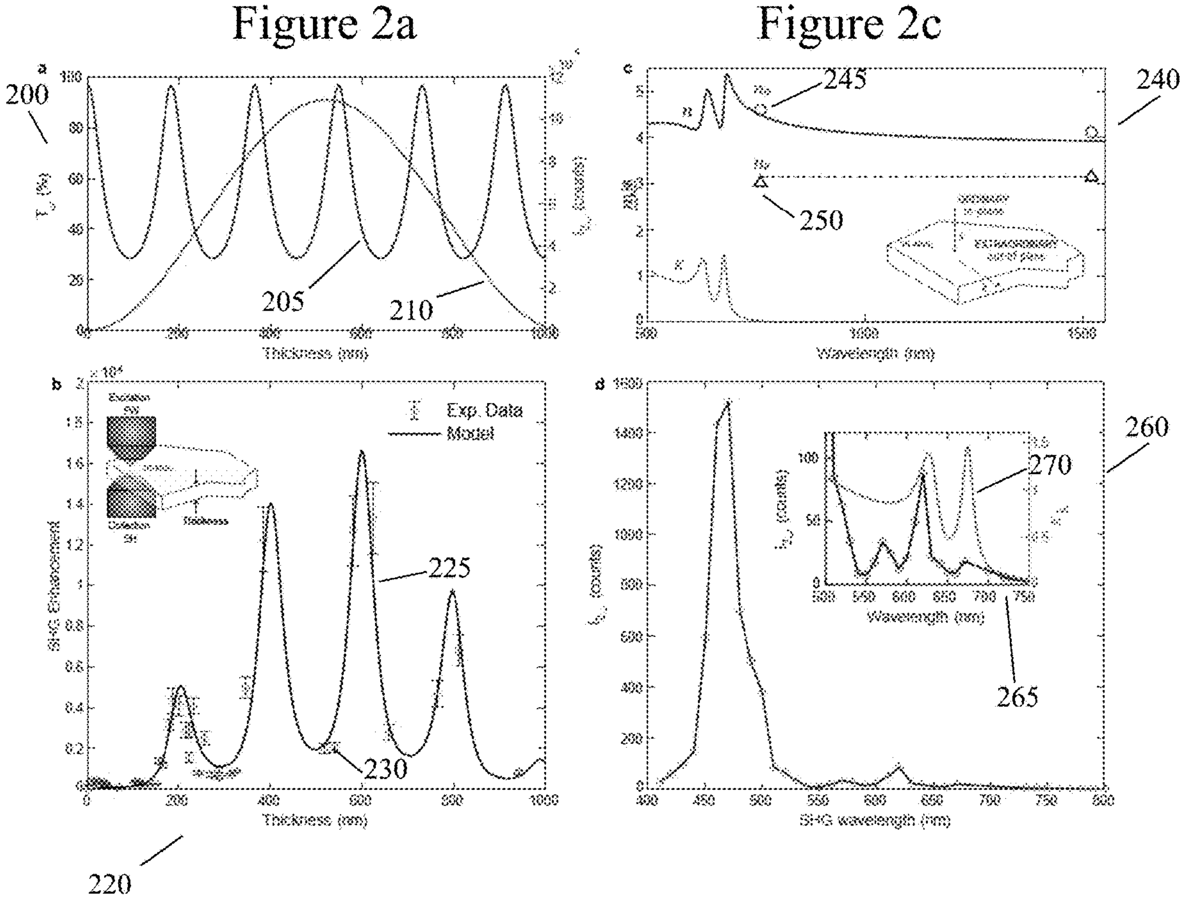
FIGS. 2*a*-2*d* are a set of graphs providing in-plane SHG coherence length, according to exemplary embodiments of the present disclosure.

The discrepancy in refractive index for the FW at frequency ω and the SH at 2ω sets further constraints on conversion. Efficient frequency conversion in bulk nonlinear crystals is achieved by fulfilling the phase-matching condition, i.e. by coherently adding the signals generated at different longitudinal coordinates of the crystal. Due to the frequency dependence of the refractive index, after a certain propagation length the locally generated SH will be out of phase with the SH from previous planes of the crystal. The overall SH in-tensity continues to grow until the so-called coherence length Lc is reached and then begins to decrease due to destructive interference [see, e.g., Ref 21]. The SH intensity under phase-mismatched conditions can be written as:

$$I_{2\omega} \propto \frac{|x^{(2)}|^2}{\Delta k^2} I_{\omega} \sin\left(\frac{\Delta kh}{2}\right) \qquad (2)$$

where $\Delta k=k_{2\omega}-2k_{\omega}=2\omega/c(n_{2\omega}-n_{\omega})$ is the wavevector mismatch between the SH and the FW (see FIG. 2*a*, line 210). Equation (2) indicates that the maximum efficiency is reached for a thickness of the nonlinear crystal corresponding to the coherence length $L_c=\pi/\Delta k$. By combining thickness-dependent FW transmission $T_{\omega}(h)$ and the phase-matching relationship, the SHG efficiency can be modulated by both multilayer interference effects and by the phase mismatch, thus giving an optimal thickness (or a beneficial thickness) of the nonlinear crystal.

As discussed herein, to avoid absorption losses, e.g., it is possible to select FW and SH photon energies below the optical gap of $MoS_2$. The experimental data of the measured nonlinear emission and the fitting curve $I_2\omega(h)$ are shown in the exemplary graph of FIG. 2*b*, with the amplitude as the only free fitting parameter. In particular, FIG. 2*b* illustrates a graph 220 for an exemplary measured thickness-dependent SHG enhancement of 3R—MoS2 with respect to the monolayer (circles 230) and calculated theoretical enhancement (line 225). FW and SH photon energies are 0.815 eV and 1.63 eV, respectively. The pump power is maintained at least approximately constant at about 5.4 mW, and the linear pump polarization can be at least approximately parallel to the armchair direction. The error bars represent the variance of the nonlinear signal over the flake area, originating from the sample inhomogeneity, which induces a fluctuation in the nonlinear signal of ~10%.

The ~10% fluctuation of the nonlinear signal can originate from the sample spatial inhomogeneity. The measured real refractive indices of 3R—$MoS_2$ are $n_{\omega}=3.795$ at 0.815 eV and $n_{2\omega}=4.512$ at 1.63 eV, and the corresponding real refractive index mismatch is $n_{2\omega}-n_{\omega}=0.717$, which is in agreement with previously reported values for bulk 2H—$MoS_2$ [see, e.g., Refs. 28 and 29]. These exemplary values provide, for a pump photon energy of 0.815 eV, a coherence length $L_c$~530 nm and a transmittance period of about 182 nm for 3R—$MoS_2$, in a very good agreement with experimental results (see FIG. 2*b*). In a low thickness regime, the deviation of the experimental data from the model calculated with the TMM can be due to an evolution of the band-structure. The exemplary refractive index of mono- and few-layer TMDs can differs from the refractive index of bulk $MoS_2$ [see, e.g., Ref 30], with thinner films having smaller refractive index and larger overall transmissivity. In the exemplary model according to an exemplary embodiment of the present disclosure, it is possible to estimate the thickness-dependent SHG using the bulk refractive index. Therefore, at lower thicknesses, the SHG intensity can be higher than the calculated intensity.

For example, the largest experimental SHG enhancement with respect to a monolayer, obtained for a 622 nm thick 3R—$MoS_2$ crystal, can be approximately $1.5\times10^4$. Preferably, covering the flake with an anti-reflection coating at the FW could further increase the nonlinear conversion efficiency. According to the phase mismatching curve (line 210 in FIG. 2*a*), selecting a 3R—$MoS_2$ thickness of 530 nm can yield the intrinsic limit for enhancement of $1.1\times10^5$ times with respect to the monolayer $MoS_2$ within one coherence length at the pump photon energy of 0.815 eV. Considering that the reported conversion efficiency of monolayer $MoS_2$ at FW=1560 nm is ~$7\times10^{-11}$ at 30 GW/$cm^2$ [see, e.g., Ref. 25], the overall conversion efficiency of $MoS_2$ at the coherence length thickness can be ~$10^{-6}$ to $10^{-5}$. The exemplary results indicate that, e.g., in order to realize an optimal nonlinear conversion efficiency, it is preferrable to select a material thickness close to the coherence length and that at the same time guarantees constructive interference for the FW. Further enhancement can then be achieved by, e.g., regularly structuring or poling larger crystals or waveguides with a periodicity on this length scale, or by exploiting birefringence.

An exemplary advantage of 3R—$MoS_2$ for nonlinear frequency conversion$_{FW}$ becomes particularly striking when its conversion efficiency density $\eta := P_{SH}/(P^2 L^2)$ is compared with that of state-of-the-art $LiNbO_3$ devices at the telecom wavelength. Utilizing the exemplary measured material parameters, it is possible to calculate $\eta$=71 800% $W^{-1}cm^{-2}$ in 3R—$MoS_2$ for L=622 nm, while $\eta$=460% $W^{-1}cm^{-2}$ for $LiNbO_3$ on an insulator waveguide with 50 μm propagation length [see, e.g., Ref. 31]. The coherence length $L_c$ of $LiNbO_3$ at FW 1545 nm is about 9.5 μm [see, e.g., Ref. 32], and the conversion efficiency at the coherence length $L_c$ is $I_{2\omega}/I_{\omega}3\times10^{-8}$. Notably, e.g., 3R—$MoS_2$ achieves similar conversion efficiencies with two orders of magnitude shorter propagation lengths.

To probe the effects of excitonic and interband transitions on the $X^{(2)}$ of 3R—$MoS_2$, it is possible to obtain the full refractive index spectrum of a bulk crystal using a combination of transmission and reflection experiments and compare the results with the SHG frequency dependence. The full exemplary refractive index spectrum for in-plane polarization shown in FIG. 2*c* (for a wide range spectrum see SI) can be provided. In particular, FIG. 2*c* shows a graph 240 providing Real (n) and imaginary (κ) part of the refractive index of bulk 3R—MoS2 ($n_1$=n+iκ). n and κ are extracted from the transmittance and reflectance spectra of a representative 94 nm thick 3R—$MoS_2$ on fused silica substrate. The exemplary peaks in κ at about 675 nm and 624 nm can be attributed to A and B excitonic resonances. Circles 245 and triangles 250 represent the ordinary ($n_o$) and extraordinary ($n_e$) refractive indexes determined by s-SNOM, illustrated in FIG. 5. The dashed line indicates the average ne in the low energy range, expected to be nearly constant [see, e.g., Ref 29].

In FIG. 2*c*, the real and imaginary components of the index, n and κ, can be retrieved from the complex dielectric function E, which is extracted from transmittance (T) and reflectance (R) spectra measured on a~94 nm 3R—$MoS_2$ crystal on a fused silica substrate (see SI). The absorption resonances of the κ(λ) spectrum, illustrated in the inset 265 of FIG. 2*d*, can be attributed to excitonic effects. In particular, FIG. 2*d* illustrates a graph 260 of SHG excitation spectrum measured on a 4.2 nm thick 3R-MoS2, with a constant pump power of 1.35 mW and tunable FW (1.55 eV-3.02 eV). Inset 265 shows a graph of a comparison between the SHG spectrum and the imaginary refractive index κ (line 270) zooming in the excitonic resonance absorption energy range. For example, the peaks at 675 nm and 624 nm are A and B excitons [see, e.g., Refs. 33 and 50]. The onset of the transparency region of 3R—$MoS_2$ lies at ~750 nm.

Indeed, as illustrated in FIG. 2*d*, the SHG spectrum measured on a 4.2 nm thick 3R—$MoS_2$ flake on 200 μm thick $SiO_2$, revealing the wavelength dependence of the $\chi_{(2)}$ of 3R—$MoS_2$ along the armchair direction. The response of the exemplary system according to exemplary embodiments of the present disclosure has been calibrated with a standard alpha-quartz sample. The error of the measurement is negligible, as it mainly originates from the laser power fluctuations, inducing a change in the nonlinear signal of ~0.1%. Here, each point can result from the average of 10 integrated spectra measured on a single spot of the flake. The main peaks at ~670 and 620 nm are consistent with the A and B exciton absorption resonances [see, e.g., Ref 34] measured on bulk 3R—$MoS_2$ (κ spectrum in grey), while the peak at 470 nm originates from high-energy transitions at the band nesting region between K and Γ points of the Brillouin zone. The slight energy deviation from the excitonic resonances in 2H—$MoS_2$ can be attributed to the different crystal structure of the 3R polytype affecting the band structure and the optical absorption.

Increasing the nonlinear conversion efficiency of 3R—$MoS_2$ for propagation lengths beyond the coherence length requires phase matching, i.e. Δk=0. Phase-matched nonlinear in—a Launch interactions exploit the optical anisotropy (birefringence) of non-centrosymmetric nonlinear crystals. Notably, perfect phase matching achieved in waveguides lies at the heart of on-chip integrated nonlinear optics. In order to explore the birefringence of 3R crystals, in the following it is possible to show far-field edge coupling of the FW into a 3R—$MoS_2$ flake enables broad-band SH emission in waveguide geometries, then it is possible to employ near-field imaging to visualize waveguided modes.

Figure 3A:
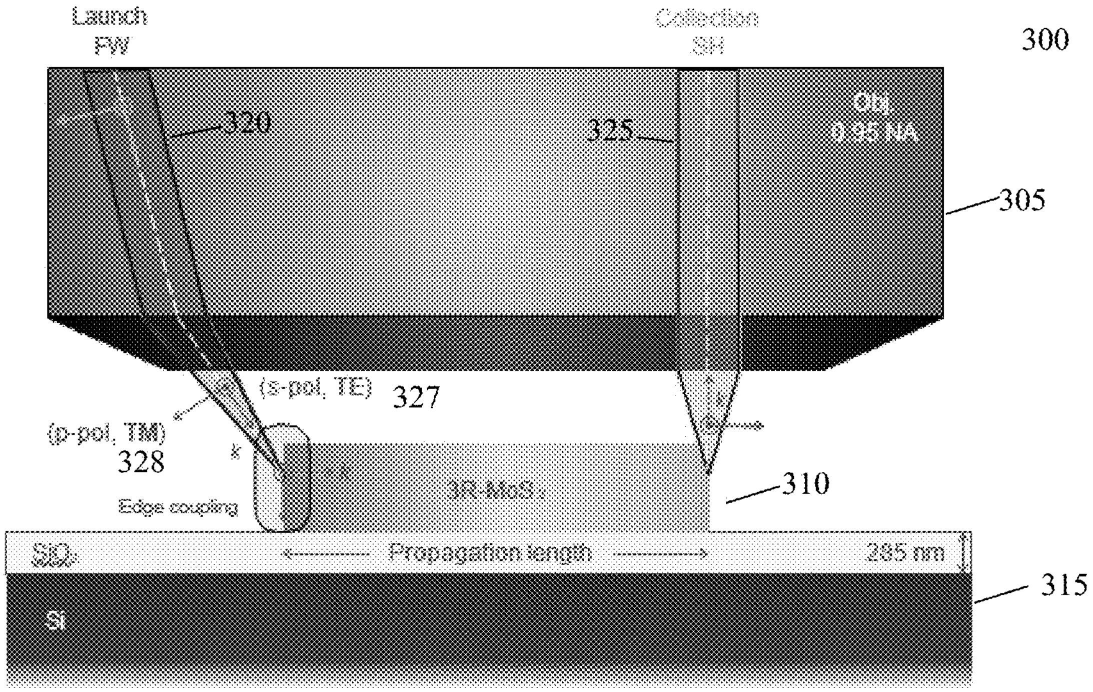
FIGS. 3*a*-3*d* are a set of configuration diagrams, illustrations and intensity maps regarding a waveguide SHG in $_3$R—$MoS_2$, according to exemplary embodiments of the present disclosure.

It is possible to use, e.g., a confocal microscope 300 in reflection geometry (see FIG. 3*a*) to probe the nonlinear frequency conversion in a waveguiding flake of 3R—$MoS_2$. In particular, FIG. 3*a* shows a schematic diagram of another exemplary configuration 300 with the edge coupling in reflection geometry, according to an exemplary embodiment of the present disclosure. The excitation beam 320 is displaced away from the center of an objective 305 to achieve edge coupling on one side of the 3R—$MoS_2$ flake 310, which has a thickness of 1.2 μm and a lateral size of ~25 μm (propagation length). With the same objective 305, it is possible launch the FW beam 325 and collect the emitted SH from the other side of the flake 310. Indeed, the flake 310 is provided above the $SiO_2$ substrate 315.

Figure 3B:
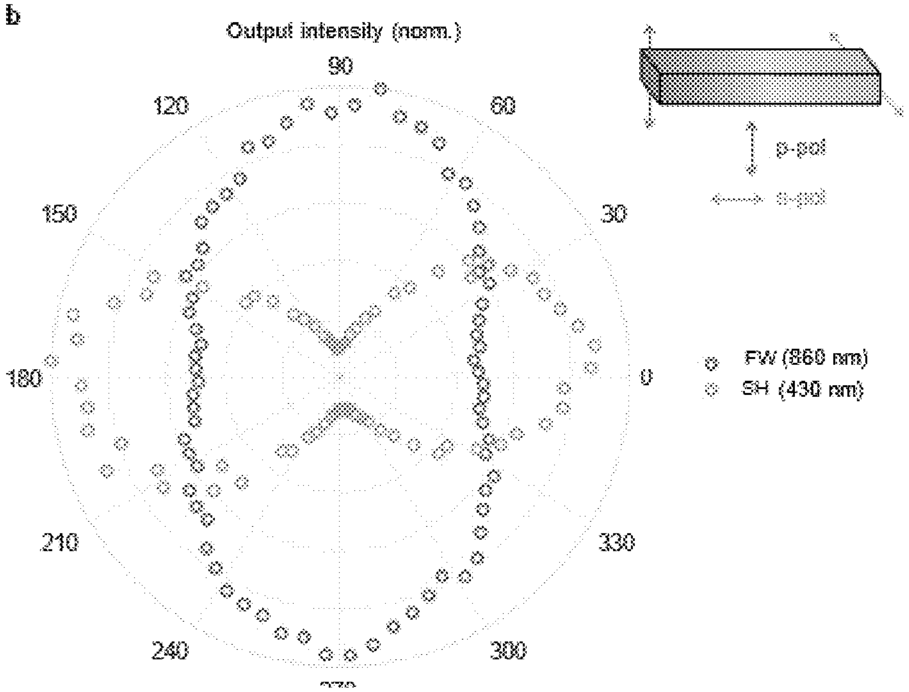

The FW beam 320 can be displaced to the side of the objective 305 (e.g., about 0.95 NA) to achieve edge coupling on one side of the flake. By tuning the polarization of the FW beam 320, it is possible to launch both transverse electric (TE)-like mode 327 and a transverse magnetic (TM)-like mode 328. The SH beam 325 generated inside the 3R—$MoS_2$ waveguide over a propagation length of ~30 μm can be detected from the opposite side of the flake 310 with the same objective 305. The output FW and SH beam intensities can both depend on the FW polarization (see FIG. 3*b*). In particular, FIG. 3*b* shows an illustration of an exemplary collected output intensity of FW and SH beams 320, 325 as a function of the input polarization. For p-polarized excitation we achieve the highest transmission of the FW beam 320, while the SH beam 325 can be maximum for s-polarized excitation. While the most efficient FW edge coupling inside the waveguide can be achieved for p-polarized light, i.e. TM modes 328, the conversion efficiency of SHG is maximum when the FW can be s-polarized, e.g., when TE modes 327 are launched. This result can be ascribed to the asymmetry of the FW electric field in the TE mode 327. The field can be aligned to $MoS_2$ sheets, and to the armchair direction specifically, whose dipole moment can also be asymmetric.

Figure 3C:
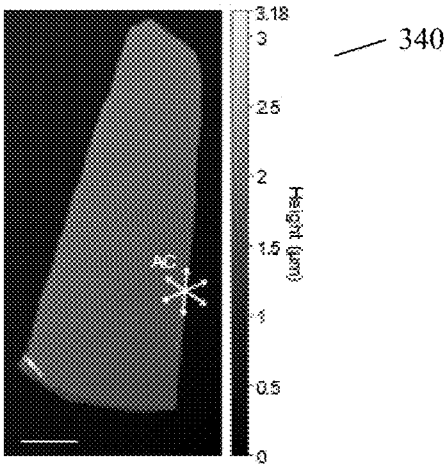
Figure 3D:
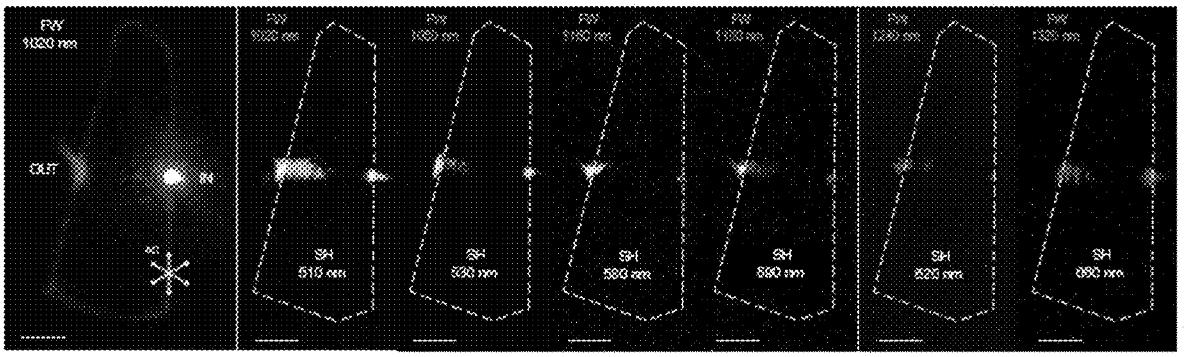

FIG. 3*c* shows an illustration of an exemplary AFM map 340 of the flake which can achieve broadly tunable waveguided SHG, according to the exemplary embodiments of the present disclosure. The micrographs of the edge coupling of a representative FW at 1020 nm and the SH at 510 nm, 530 nm, 580 nm, 590 nm, 620 nm and 660 nm are shown in FIG. 3*d*. For example, the FW polarization can be set parallel to the AC direction, which can be aligned to the input edge of the flake (e.g., AC directions are shown in the AFM map 340 and the top left panel of FW=1020 nm).

FIG. 3*d* shows a set of exemplary images of the edge coupling at FW=1020 nm and the broadly tunable SH fringes at different wavelengths. The dashed lines represent the edges of the sample, with the scale bar being 10 μm.

Figure 4E:
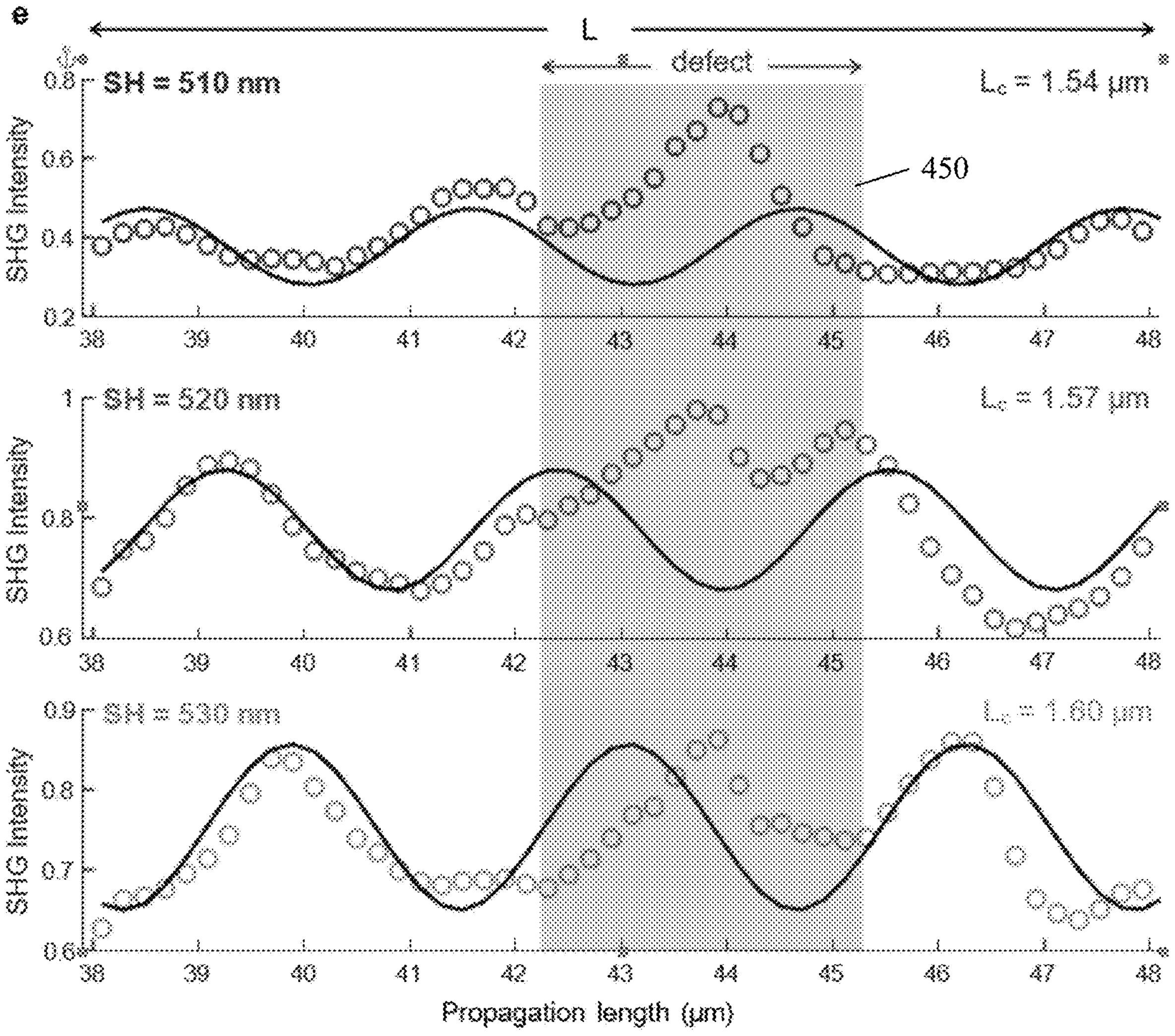

In FIGS. 4*a*-4*e*, an exemplary mechanism of the edge coupling and the out-of-plane SH coherence length in 3R—$MoS_2$ waveguides, according to the exemplary embodiments of the present disclosure is shown. By vertically displacing the excitation spot across the input edge (see FIG. 4*a*), the SH fringe pattern changes accordingly, indicating that the FW coupling efficiency depends sensitively on the relative position of the input edge. In particular, FIG. 4*a* shows an exemplary image of the SH (e.g., 660 nm) fringe pattern at different vertical coordinates of the FW (1320 nm) excitation spot across the sample edge. The integrated SH intensity (top panel) at the output edge of the 3R—$MoS_2$ waveguide as a function of the vertical coordinate is fitted with a Gaussian profile. For all the reported 2D maps, the pump polarization direction can parallel to one of the AC directions, aligned to the sample edge. In this exemplary case, to reiterate, the overall intensity of the output SH fringe pattern as a function of the FW vertical displacement is fitted with a Gaussian profile, which is consistent with the approximate profile of the focused excitation.

To obtain the out-of-plane coherence length, it is possible to measure waveguide SH as a function of the propagation length. It is possible to select a 775 nm thick 3R—$MoS_2$ flake with a sharp horizontal input edge, and a diagonal output edge (see FIGS. 4*b* and 4*c*). In particular, FIG. 4C illustrates an exemplary optical image of the flake used for measuring SHG as a function of propagation length L, e.g., for the determination of the coherence length. FIG. 4*c* shows an exemplary zoom-in on the output edge. All scale bars are provided in FIG. 4*c* as being 10 μm. In this exemplary way, by scanning the FW beam along the input edge over a ~50 μm distance, it is possible to collect the output FW and SH as a function of the propagation length within the slab.

The exemplary intensity maps of FW and SH at different wavelengths are shown in FIG. 4*d*. In particular, FIG. 4*d* illustrates exemplary transmitted FW/SH intensity maps at the output edge as a function of excitation spot coordinates across the bottom edge, e.g., at 3 different wavelengths. The scanned input area is about 50 μm×3 μm. Upon scanning the FW beam along the input edge, at each point, it is possible to collect the total transmitted FW and generated SH from the other side of the flake. The intensity of each pixel can thus represent the total collected FW and SH, respectively, integrated over the collection region at the output edge. The measured FW maps can quantify the actual FW intensity coupled into the flake, which can be affected by spatial inhomogeneities of the input edge. To quantify the thickness-dependent SHG with constant FW power, it is possible to normalize the a SH intensity maps by the FW maps, as: $SH/FW^2$.

The normalized SH intensity profiles at the 3 different wavelengths, as a function of the propagation length, i.e. the distance between input and output edges, are shown in the exemplary graphs of FIG. 4*e*. In particular, FIG. 4*e* shows the exemplary graphs of an exemplary normalized SH intensity as a function of L, along with the fitting curves and the extracted coherence lengths $L_c$. The data under the shaded region 450 can exhibit deviations from the oscillating trend due to the present of a defect at output edge.

The SH intensity profiles can be fitted to Eq. (2), with constant $I_\omega$. For example, the highlighted region 450 changes irregularly due to the presence of a defect at the output edge (see zoom-in 430 of a spatial defect in FIG. 4*d*). The fitting profile of the oscillating phase-mismatched SHG can provide the out-of-plane coherence lengths $L_c$, which are 1.54 μm, 1.57 μm and 1.60 μm at the SH wavelengths of 510 nm, 520 nm and 530 nm, respectively. Considering the multi-mode capacity of the 3R—$MoS_2$ in this thickness, the extracted Δk here is likely related to the primary modes of the FW and SH with the mode dispersion relationship discussed in more details below. The waveguide frequency conversion and quantification of coherence lengths described herein can facilitate a device fabrication, structuring and $\chi^{(2)}$ mode engineering in next-generation compact TMD platforms.

To further identify the conditions for phase matching, it is possible to characterize the birefringence of 3R—$MoS_2$ by imaging the propagation of waveguide modes (WMs) in real space using near-field nano-imaging. Due to their layered nature, van der Waals crystals can exhibit very different dielectric properties along the in-plane and out-of-plane directions [see, e.g., Refs. 29 and 35]. Since the far-field implementation according to various exemplary embodiments of the present disclosure described above are mostly sensitive to the in-plane optical properties of thin 3R—$MoS_2$ flakes, in order to access the full dielectric tensor of 3R—$MoS_2$, the propagation of WMs [see, e.g., Refs. 15 and 35-40] can be performed featuring in- and out-of-plane electric field components using scattering-type scanning near-field optical microscopy [see, e.g., Ref 41] (s-SNOM, see exemplary configuration of FIG. 5*a*).

FIG. 5*a* shows exemplary diagrams of the near-field configurations 505 and concept of grating coupled SHG in a TMD waveguide 510. In exemplary maps of the exemplary scattered amplitudes $s_n$ at near-infrared photon energies, WMs can manifest as periodic modulations. FIGS. 5*b* and 5*c* illustrate exemplary maps of the near-field amplitude $s_n$ obtained using excitation wavelengths λ=760 nm (FIG. 5*b*) and λ=1520 nm (FIG. 5*c*) on a flake with h=215 nm. The lines 520, 525 were obtained by averaging along the vertical direction. Insets 530, 535 are graphs of exemplary Fourier analysis of the WMs. The wavevector k is given in units of the free-space wavevector $k_0$.

Indeed, for FIG. 5*b*, the wavevectors of the contributing modes are shown in the inset 530 and were extracted with an exemplary procedure. For example, the momenta are given in units of the free-space wavevector $k_0$ of the incident light. In this case, the interference pattern comprises two transverse magnetic ($TM_x$) and two transverse electric ($TE_y$) modes, mostly characterized by out-of-plane and in-plane electric fields [see, e.g., Ref 42], respectively. Since the fields at the apex of the near-field tip are dominated by out-of-plane components, the $TM_x$ modes can be excited more efficiently and consequently have larger spectral amplitudes than the $TE_y$ counterparts. An analogous map of $s_n$ for an incident wavelength of 1520 nm is provided in FIG. 5*c*.

To obtain the full refractive index tensor of 3R—$MoS_2$ for 760 nm and 1520 nm, it is possible to systematically vary the sample thickness (see FIGS. 5*d* and 5*e*) and trace the evolution of $TM_x$ and $TE_y$ modes, thereby determining the in-plane and the out-of-plane refractive indexes, $n_o$ and $n_e$, respectively.

In particular, FIGS. 5*d* and 5*e* show Thickness dependence of the wavevectors k of TEy and TMx modes at excitation wavelengths λ=760 nm (FIGS. 5*d*) and λ=1520 nm (FIG. 5*e*). The color code shown in FIG. 5*d* also applies to the symbols in FIG. 5*e* and in the insets 530, 535 of FIGS. 5*b* and 5*c*, respectively. The dispersion of the WMs can be calculated via the imaginary part of Fresnel reflection coefficients for s-polarized (rs) and p-polarized (rp) light. All error bars represent the relative uncertainty determined by the average FWHM of the peaks in the Fourier analysis.

For example, it is possible to model the WMs dispersion via the imaginary part of Fresnel reflection coefficients for s-polarized ($r_s$) and p-polarized ($r_p$) light calculated with the code provided in Ref. 43. It is possible to obtain the best agreement with the exemplary experimental data for: ($n_o$, $n_e$)=(4.60, 3.03) (λ=760 nm, see FIG. 5*d*) and ($n_o$, $n_e$)=(4.12, 3.15) (λ=1520 nm, see exemplary graph of FIG. 5*e*). When the finite NA of the objective lens in the far-field experiment is considered, the near-field measurement of the in-plane dielectric response $n_o$ is consistent with the refractive index (n) shown in the exemplary graph 240 of FIG. 2*c*. Due to the similar crystal structure, the in-plane properties of 3R—$MoS_2$ match previous reports on the 2H polytype [see, e.g., Ref. 35]. These exemplary results verify that infrared nano-imaging is a sensitive probe of anisotropic optical properties.

The full WM dispersion of a representative flake (h~215 nm) derived by the exemplary anisotropic model is shown in FIG. 5*f*. In particular, FIG. 5*f* illustrates exemplary graphs for anisotropic WM dispersion for h=215 nm calculated with the same matrix formalism [see, e.g., Ref. 43] as provided in FIGS. 5*d* and 5*e*, and using the dielectric responses described herein as input. The arrow 550 indicates Δk between different WMs for SHG at a FW of 1520 nm (0.815 eV). Inset 560 provides an exemplary graph of phase-matching of WMs. The wavevector k of the TEO mode (line 565) at the FW can be matched to higher-order SH WMs (lines 570) at 760 nm by varying the crystal thickness and thereby minimizing Δk.

For example, $n_o$ plotted in the exemplary graph 240 of FIG. 2*c* was used as an input and $n_e$ was kept constant—a reasonable assumption for the range of photon energies below the exciton resonances [see, e.g., Ref. 29] (compared to the illustration of FIG. 3*c*). For this particular thickness h, the wavevector difference (Δk, previously visualized in the phase mismatch graph of FIG. 5*d*) between WMs at the FW and at the SH is sizable. Due to the birefringence of the crystal, TM and TE branches exhibit significantly different dispersions. Therefore, by tailoring the thickness of the 3R—$MoS_2$ slab, the $TE_0$ modes at the FW and selected higher-order modes at the SH can be phase-matched in a waveguide geometry (see inset 560 of FIG. 5*f*). Different FWs or other nonlinear processes can be analyzed in a similar fashion.

Further, e.g., edge coupling shown in FIGS. 3*a*-3*d* and FIGS. 4*a*-4*e* can occur at a natural edge of the flake. To achieve a more efficient in-plane momentum propagation through the waveguide, prism or grating couplers (see panel 519 of the exemplary configuration of FIG. 5*a*) directly placed on top of the waveguide can be beneficial. Further exemplary fabrication and structure engineering in accordance with the exemplary embodiments of the present disclosure can facilitate tailored mode excitations that can boost the conversion efficiencies of SHG in waveguides of van der Waals semiconductors.

Exemplary Conclusions

The second-order nonlinear frequency conversion from 3R—$MoS_2$, a naturally non-centrosymmetric layered material, has been characterized as a function of the propagation length, both along the in-plane and the out-of-plane directions. In-plane SHG can be generated by far-field normal incidence, while out-of-plane SHG can be facilitated by edge coupling in a waveguide geometry. Both in-plane and out-of-plane SH coherence lengths can be provided, thereby, e.g., achieving an important value for the nonlinear conversion efficiency in TMDs, exceeding the monolayer value by more than four orders of magnitude. For nonlinear integrated photonics, the exemplary demonstration of waveguide SHG in 3R—$MoS_2$ slabs can provide the same conversion efficiencies associated with $LiNbO_3$ and within propagation lengths that are two orders of magnitude shorter at telecom wavelengths [see, e.g., Refs. 31 and 44]. In addition, waveguiding in van der Waals semiconductors can facilitate top-down fabrication compatibility and straightforward integration to Si-based platforms.

These exemplary results are corroborated by, e.g., transfer-matrix calculations including both multilayer interference effects and phase-matching constraints. Furthermore, the full dielectric tensor of 3R—$MoS_2$ is accessed using waveguide-mode nano-imaging. The determined birefringence along in- and out-of-plane directions, as supported by numerical models, allows one to evaluate phase-matching conditions via mode dispersion relationship for any nonlinear process in a waveguide geometry as a function of sample thickness. Moreover, due to the larger transparency window along the out-of-plane direction of TMDs [see, e.g., Ref 29], it is possible to harness the $TM_x$ modes, thereby partially circumventing the losses of the in-plane dielectric response close to the exciton resonances. This scheme provides a viable handle to design and evaluate integratable nonlinear photonic devices based on 3R TMD systems.

In addition, due to the weak interlayer van der Waals forces, TMDs can provide important advantage(s) of being easily stackable into vertical heterostructures with nearly arbitrary relative orientation or twist angle [see, e.g., Ref. 23] due to their atomically flat interfaces free of lattice mismatch limitations. This capability can be exploited to extend the concept of quasi-phase-matching to non-centrosymmetric layered semiconductors using periodically poled TMD structures, achieved by stacking multilayer 3R-TMDs plates, each with a thickness corresponding to the coherence length determined in the present work—suitably rotated in order to intro-duce a π phase shift between consecutive layers. Periodic poling in 3R-TMDs can provide a macroscopic nonlinear gain with values achieved in millimeter-thick crystals of standard materials, but with thicknesses that are more than 100-fold smaller. Thus, by virtue of the exceptional nonlinear properties and the possibility of cavity integration and phase-matching in waveguide geometries, ultra-compact devices with extremely high nonlinear conversion efficiency can be utilized—even exceeding multi-pass state-of-the-art photonic resonators of aluminum nitride [see, e.g., Ref. 45]—opening new frontiers for engineering on-chip integrated nonlinear optical devices including periodically poled structures, photonic resonators, and optical quantum circuits.

Exemplary Methods

Exemplary Transmission Spectroscope

The exemplary transmission microscope shown in FIG. 2*a* can include, e.g., an excitation laser which can be focused by a 40× reflective objective (e.g., Thorlabs) with numerical aperture, e.g., NA=0.5. The emitted SHG and DFG can be detected by a 50× objective (e.g., Nikon) with NA=0.95. The sample can be loaded on a 3-axis piezo stage (PI)/2-axis manual stage (e.g., Thorlabs). The focus of each flake can be adjusted with the z-axis of the piezo stage while the position of the top/bottom objectives are fixed. The laser source (e.g., Coherent) can be a Ti:Sapphire oscillator emitting 120 fs pulses at 1.55 eV with a repetition rate of 80 MHz. The oscillator seeds an optical parametric oscillator emitting pulses tunable from 0.83 eV to 1.21 eV. The excitation spot diameter on the sample is ~1 μm, corresponding to a peak intensity of ~2.7 GW/cm$^2$ for an average power of 1 mW impinging on the sample. The nonlinear emission is detected with a Silicon-EMCCD camera. Accounting for all the transmissive optical elements of the exemplary configuration, both pump and signal pulses can have a duration of ~250 fs at the sample plane, and in DFG mapping they are temporally synchronized using, e.g., a mechanical delay stage before the excitation objective.

Exemplary Waveguide Nano-Imaging

Near-field experiments can be performed with a scattering-type scanning near-field optical microscope (e.g., s-SNOM, Neaspec GmbH). The atomic force microscope (AFM) can operate in tap-ping mode with a frequency of ~70 kHz and a tapping amplitude of ~50 nm. The scattered light is detected using a photodiode and a pseudo-heterodyne scheme [see, e.g., Ref 46]. To suppress any far-field background, the scattered amplitudes $s_n$ are additionally demodulated at higher harmonics of the tip tapping frequency.

Based on this exemplary technique, WMs in multi-layer TMDs can be visualized as follows [see, e.g., Refs. 36 and 42]: continuous-wave radiation from a tunable Ti:sapphire laser [see, e.g., Ref. 47] is focused onto the metal tip (compare to FIG. 5*a*). There, the radiation is coupled into evanescent fields. As an exemplary result, this source of nano-light can excite WMs with momenta exceeding the light line, which subsequently propagate away from the tip apex as cylindrical waves. At the sample boundaries, the WMs can again be coupled out into free space. Together with the incident light that is directly scattered from the tip, this radiation is collected by the parabolic mirror of the microscope. The interference of the light emerging from the tip apex and the sample edges gives rise to characteristic fringe patterns in maps of the scattered field amplitude $s_n$ (compare to exemplary illustrations of FIGS. 5*b* and 5*c*). Alternatively or in addition, the incident light can directly couple to WMs at the flake edges, propagate towards the tip, be scattered into the far field and interfere with radiation scattered directly from the tip. Nevertheless, both scenarios yield interference fringes with the same periodicity facilitating an extraction of the WM wavevector.

Exemplary Wavevector Extraction and WM Dispersion

In line traces of the scattered amplitude $s_n$ (compare lines in shown in illustration of FIGS. 5*b* and 5*c*), the wavevectors of the WMs forming the interference pattern can be extracted via a Fourier transform. Thus, e.g., the spectral components generated by the step-like increase of $s_n$ at the sample edge should be suppressed and the relative positions of tip, sample edge, and detector should be taken into account. For the former, a Parzen window is used—a procedure introduced in ref. [see, e.g., Ref 35], whereas the geometrical correction derived in the Supplementary Information of Ref 36 is used for the latter. In summary, the wavevector $k_{W\ G}$ of the WM is related to the observed wavevector $k_{Obs}$ given by the periodicity of the interference fringes via the following relation:

$$k_{W\ G} = k_{Obs}\cos(\beta) + k_0\cos(\gamma)\sin(\beta+\delta)$$

For example, $\beta_k=\sin^{-1}(^k0\ \cos(\gamma)\cos(\beta))$, whereas $k_0$, $\gamma$, and $\delta$ are the wavevectors of the free-WG space radiation$^k$, as well as the out-of-plane and in-$^k$plane angles of incidence of the light with respect to the sample edge. For details, see, e.g., Ref 36. When considering the relative wavevectors $^k$WG 0 for the $TM_x$ and $TE_y$ modes, the dispersions shown in FIGS. 4*d* and 4*e* approach the out-of-plane ($n_e$) and in-plane refractive indices ($n_0$), respectively, in the limit of infinitely thick samples [see, e.g., Ref. 48]. As a result, e.g., the smaller values of $^k$WG for λ=1520 nm (see FIG. 5*d*) compared 0 to the values for λ=760 nm (see FIG. 5*e*) highlight a difference in refractive index even without further modelling.

For an exemplary quantitative analysis of the WM dispersion, the matrix formalism provided in Ref. 43 was adapted to calculate the Fresnel reflection coefficients $r_s$ and $r_p$ for anisotropic multi-layered structures. For the data in the inset of FIG. 4*f*, the transcendental equations in Ref. 35 were solved instead. This analogous procedure essentially yields curves that trace the maxima of $\mathrm{Im}(r_p+r_s)$ as, for example, shown in FIGS. 5*d*-5*f*, while neglecting the finite thickness of the $SiO_2$ (~285 nm) and hence the Si chip underneath.

Exemplary Broadband Reflectance and Transmittance Measurements

The near-infrared and visible reflectance and transmittance spectra of 3R—$MoS_2$ flakes were measured using a Hyperion 2000 microscope coupled with a Bruker FTIR spectrometer (Vertex 80V). A tungsten halogen lamp was used as a light source covering a frequency range of 0.5 to ~2.5 eV. Unpolarized light was focused on the sample using a ×15 objective and the aperture size was set to be smaller than the sample dimensions. The reflectance and transmittance spectra are normalized to the bare substrate region. A Mercury-Cadmium-Telluride (MCT) detector and a Silicon detector were used for the near-infrared and visible range, respectively.

Exemplary Embodiments and Improvements

Nonlinear frequency conversion provides essential tools for light generation, photon entanglement, and manipulation. Transition metal dichalcogenides (TMDs) possess large nonlinear susceptibilities and 3R-stacked TMD crystals further combine broken inversion symmetry and aligned layering, representing important candidates to boost the nonlinear optical gain with minimal footprint. Accordingly to exemplary embodiments of the present disclosure, the efficient frequency conversion of 3R—$MoS_2$ are described, providing the evolution of its exceptional second-order nonlinear processes along the ordinary (in-plane) and extraordinary (out-of-plane) directions. Along the ordinary axis, by measuring difference frequency and second harmonic generation (SHG) of 3R—$MoS_2$ with various thickness—from monolayer (~0.65 nm) to bulk (~1 μm)—it is possible to provide the first measurement of the SHG coherence length (~530 nm) at, e.g., 1520 nm and achieve record nonlinear optical enhancement from a van der Waals material, >$10^4$ stronger than a monolayer. It is found that $3R—MoS_2$ slabs exhibit similar conversion efficiencies of lithium niobate, but within propagation lengths that are more than 100-fold shorter at telecom wavelengths. Furthermore, along the extraordinary axis, it is possible to achieve broadly tunable SHG from $3R—MoS_2$ in a waveguide geometry, revealing the coherence length in such structure for the first time. The full refractive index spectrum can be characterized and both birefringence components in anisotropic $3R—MoS_2$ crystals with near-field nano-imaging can be quantified. Using such data, it is possible to determine the intrinsic limits of the conversion efficiency and nonlinear optical processes in $3R—MoS_2$ attainable in waveguide geometries.

The exemplary analysis highlights the potential of 3R-stacked TMDs for integrated photonics, providing critical parameters for designing highly efficient on-chip nonlinear optical devices including periodically poled structures, resonators, compact optical parametric oscillators and amplifiers, and optical quantum circuits. Nonlinear optics lies at the heart of light generation and manipulation. Coherent frequency conversion, such as second- and third-harmonic generation, parametric light amplification and down-conversion, facilitates a deterministic change in wavelength as well as control of temporal and polarization properties. When integrated within photonic chips, nonlinear optical materials constitute the basic building blocks for all-optical switching [see, e.g., Refs. 1-3], light modulators [see, e.g., Refs. 4-7], photon entanglement [see, e.g., Refs. 8 and 9] and optical quantum information processing [see, e.g., Refs. 10 and 11].

Conventional nonlinear optical crystals display moderate second-order nonlinear susceptibilities ($|\chi^{(2)}|$~1-30 pm/V) and perform well in benchtop setups with discrete optical components. However, such crystals do not easily lend themselves to miniaturization and on-chip integration. Two-dimensional transition metal dichalco-genides (TMDs) possess huge nonlinear susceptibilities [see, e.g., Ref. 12] ($|\chi^{(2)}|$~100-1000 pm/V) and, due to their deeply sub-wavelength thickness, offer a unique platform for on-chip nonlinear frequency conversion [see, e.g., Ref. 13] and light amplification [see, e.g., Ref. 14]. Furthermore, their semiconducting properties render TMDs superior for applications compared to opaque materials with exceptionally large $|\chi^{(2)}|$ such as Weyl semimetals [see, e.g., Ref. 15].

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following reference is hereby incorporated by references, in their entireties:

[1] Ono, M. et al. Ultrafast and energy-efficient all-optical switching with graphene-loaded deep-subwavelength plasmonic waveguides. *Nat. Photonics* 14, 37-43 (2020).

[2] Li, C. Nonlinear optics: Principles and applications. (Springer Singapore, 2016).

[3] Klimmer, S., Ghaebi, O., Gan, Z. et al. All-optical polarization and amplitude modula-tion of second-harmonic generation in atomically thin semiconductors. *Nat. Photon.* (2021). https://doi.org/10.1038/s41566-021-00859-y

[4] Sun, Z., Martinez, A. & Wang, F. Optical modulators with 2D layered materials. *Nat. Photonics* 10 227-238 (2016).

[5] Yao, K. et al. Enhanced tunable second harmonic generation from twistable interfaces and vertical superlattices in boron nitride homostructures. *Sci. Adv* 7, eabe8691 (2021).

[6] Ehren M. et al. Ultrafast Electronic and Structural Response of Monolayer $MoS_2$ under Intense Photoexcitation Conditions. *ACS Nano* 8, 10734-10742 (2014).

[7] Ghazal H. et al. Single Nanoflake Hexagonal Boron Nitride Harmonic Generation with Ultralow Pump Power. *ACS Photonics* 8, 1922-1926(2021).

[8] Dinparasti Saleh, H. et al. Towards spontaneous parametric down conversion from monolayer $MoS_2$. *Sci. Rep.* 8, 3862(2018).

[9] Wang, Y., J¨ons, K. D. & Sun, Z. Integrated photon-pair sources with nonlinear optics. *Applied Physics Reviews* 8, 011314(2021).

[10]Caspani, L. et al. Integrated sources of photon quantum states based on nonlinear optics. *Light: Science and Applications* 6, e17100 (2017).

[11]Lin, K Q., Bange, S. & Lupton, J. M. Quantum interference in second-harmonic generation from monolayer $WSe_2$. *Nat. Phys.* 15, 242-246 (2019).

[12]Yao, K. et al. Continuous Wave Sum Frequency Generation and Imaging of Monolayer and Heterobilayer Two-Dimensional Semiconductors. *ACS Nano* 14, 708-714 (2020).

[13]Chen, H. et al. Enhanced second-harmonic generation from two-dimensional $MoSe_2$ on a silicon waveguide. *Light: Science and Applications* 6, e17060 (2017).

[14]Trovatello, C. et al. Optical parametric amplification by monolayer transition metal dichalcogenides. *Nat. Photonics* 15, 6-10 (2021).

[15]Wu, L. et al. Giant anisotropic nonlinear optical response in transition metal monopnictide Weyl semimetals. *Nat. Physics* 13, 350-355 (2017).

[16]Li, Y. et al. Probing symmetry properties of few-layer $MoS_2$ and h-BN by optical second-harmonic generation. *Nano Letters* 13, 3329-3333 (2013).

[17]Malard, L. M., Alencar, T. V., Barboza, A. P. M., Mak, K. F. & De Paula, A. M. Observation of intense second harmonic generation from $MoS_2$ atomic crystals. *Phys. Rev. B* 87, 1-5 (2013).

[18]Wang G, Marie X, Gerber I, et al. Giant enhancement of the optical second-harmonic emission of $WSe_2$ monolayers by laser excitation at exciton resonances. *Physical review letters* 114, 097403 (2015).

[19]Nagler, P. et al. Giant magnetic splitting inducing near-unity valley polarization in van der Waals heterostructures. *Nat. Commun.* 8, 1551 (2017).

[20]Mennel, L. et al. Optical imaging of strain in two-dimensional crystals. *Nat. Commun.* 9, 516(2018).

[21]Robert W. Boyd *Nonlinear optics, Fourth Edition* (Academic Press, 2020).

[22]Hsu, W.-T. et al. Second Harmonic Generation from Artificially Stacked Transition Metal Dichalcogenide Twisted Bilayers. *ACS Nano* 8, 2951-2958 (2014)

[23]Liu, F. et al. Disassembling 2D van der Waals crystals into macroscopic monolayers and reassembling into artificial lattices. *Science* 376, 903-906(2020).

[24]Wang, Q., Kalantar-Zadeh, K., Kis, A. et al. Electronics and optoelectronics of two-dimensional transition metal dichalcogenides. *Nat. Nanotech* 7, 699-712 (2012).

[25]S¨ayn¨atjoki, A., Karvonen, L., Rostami, H. et al. Ultra-strong nonlinear optical processes and trigonal warping in MoS2 layers. *Nat Commun* 8, 893 (2017).

[26]Shi, J. et al. 3R $MoS_2$ with Broken Inversion Symmetry: A Promising Ultrathin Nonlinear Optical Device. *Adv. Mater.* 29, 1701486 (2017).

[27]Zhao, M. et al. Atomically phase-matched second-harmonic generation in a 2D crystal. *Light: Science and Applications* 5, e16131 (2016).

[28] Song, B. et al. Layer-Dependent Dielectric Function of Wafer-Scale 2D $MoS_2$. *Adv. Optical Mater.* 7, 1801250 (2019).

[29]Ermolaev, G. A. et al. Giant optical anisotropy in transition metal dichalcogenides for next-generation photonics. *Nat. Commun.* 12, 854 (2021).

[30]Chanyoung Yim et al. Investigation of the optical properties of $MoS_2$ thin films using spectroscopic ellipsometry. *Appl. Phys. Lett.* 104, 103114 (2014).

[31]Cai, L., Gorbach, A. v., Wang, Y., Hu, H. & Ding, W. Highly efficient broadband second harmonic generation mediated by mode hybridization and nonlinearity patterning in compact fiber-integrated lithium niobate nano-waveguides. *Sci. Rep.* 8, 12478 (2018).

[32]Shoji, I., Kondo, T., Kitamoto, A., Shirane, M. & Ito, R. Absolute scale of second-order nonlinear-optical coefficients. *J. Opt. Soc. Am. B* 14, 2268-2294 (1997).

[33]Liu, W. et al. Strong Exciton-Plasmon Coupling in $MoS_2$ Coupled with Plasmonic Lattice. *Nano Letters* 16, 1262-1269 (2016).

[34]Vaquero, D. et al. Excitons, trions and Rydberg states in monolayer $MoS_2$ revealed by low-temperature photocurrent spectroscopy. *Communications Physics* 3, 194 (2020).

[35]Hu, D. et al. Probing optical anisotropy of nanometer-thin van der waals microcrystals by near-field imaging. *Nat. Commun.* 8, 1471 (2017).

[36]Sternbach, A. J. et al. Femtosecond exciton dynamics in $WSe_2$ optical waveguides. *Nat. Com-mun.* 11, 3567 (2020).

[37]Kusch, P., Mueller, N. S., Hartmann, M. T. & Reich, S. Strong light-matter coupling in $MoS_2$. *Phys. Rev. B* 103, 235409 (2021).

[38]Mrejen, M., Yadgarov, L., Levanon, A. & Suchowski, H. Transient exciton-polariton dynamics in $WSe_2$ by ultrafast near-field imaging. *Sci. Adv.* 5, eaat9618 (2019).

[39]Li, Z. et al. High-Quality All-Inorganic Perovskite CsPbBr 3 Microsheet Crystals as Low-Loss Subwavelength Exciton—Polariton Waveguides. *Nano Letters* 21, 1822-1830 (2021).

[40]Hu, F. & Fei, Z. Recent Progress on Exciton Polaritons in Layered Transition-Metal Dichalco-genides. *Adv. Optical Mater.* 8, 1901003 (2020).

[41]Chen, X. et al. Modern Scattering-Type Scanning Near-Field Optical Microscopy for Advanced Material Research. *Adv. Mater.* 31, 1804774 (2019).

[42]Hu, F. et al. Imaging propagative exciton polaritons in atomically thin $WSe_2$ waveguides. *Phys. Rev. B* 100, 121301 (2019).

[43]Passler, N. C. & Paarmann, A. Generalized 4×4 matrix formalism for light propagation in anisotropic stratified media: study of surface phonon polaritons in polar dielectric heterostructures. *Journal of the Optical Society of America B* 34, 2128 (2017).

[44]Thomas, J. et al. Quasi phase matching in femtosecond pulse volume structured x-cut lithium niobate. *Laser and Photonics Reviews* 7, L17-L20 (2013).

[45]Bruch, A. W. et al. 17 000% W second-harmonic conversion efficiency in single-crystalline aluminum nitride microresonators. *Applied Physics Letters* 113, (2018).

[46]Ocelic, N., Huber, A. & Hillenbrand, R. Pseudoheterodyne detection for background-free near-field spectroscopy. *Applied Physics Letters* 89, 101124 (2006).

[47]Zhang, S. et al. Nano-spectroscopy of excitons in atomically thin transition metal dichalcogenides. *Nat. Commun.* 13, 542 (2022).

[48]Hu, D. et al. Tunable Modal Birefringence in a Low-Loss Van Der Waals Waveguide. *Adv. Mater.* 31, 1807788 (2019).

[49]Malitson, I. H. Interspecimen Comparison of the Refractive Index of Fused Silica. *J. Opt. Soc. Am., JOSA* 55, 1205-1209 (1965).

[50]Harland Tompkins, Eugene A Irene *Handbook of Ellipsometry* (William Andrew, 2005).

What is claimed is:

1. A method for a frequency conversion using at least one transition metal dichalcogenide (TMD) crystal, comprising:

providing at least one radiation to the at least one TMD crystal so as to generate a resultant radiation;

generating a resultant information by measuring at least one response based on a second order non-linearity from the resultant radiation provided from the at least one TMD crystal; and providing a measurement of a coherence length based on the resultant information so as to achieve the frequency conversion.

2. The method of claim 1, wherein the at least one TMD crystal includes a 3R-stacked TMD crystal.

3. The method of claim 1, wherein the at least one TMD crystal includes a 3R-$MoS_2$ crystal.

4. The method of claim 3, wherein the 3R-$MoS_2$ crystal is non-centrosymmetric.

5. The method of claim 1, wherein the at least one TMD crystal includes multilayer 3R-$MoS_2$ crystals.

6. The method of claim 1, wherein the frequency conversion is non-linear.

7. The method of claim 1, further comprising characterizing a substantially full refractive index spectrum of the resultant radiation.

8. The method of claim 1, further comprising quantifying birefringence components in the at least one TMD crystal with near-field nano-imaging.

9. The method of claim 1, wherein the measuring includes measuring a coherent light from the resultant radiation provided from the at least one TMD crystal.

10. The method of claim 1, wherein the measurement of the coherence length is based on a thickness of the at least one TMD crystal.

11. The method of claim 10, wherein the measurement is based on the thickness and a second-order nonlinearity of the at least one TMD crystal.

12. The method of claim 11, wherein the second order non-linearity includes an intrinsic phase-mismatch and interference effects of the at least one TMD crystal.

13. The method of claim 1, further comprising, using near-field nano-imaging:

characterizing a birefringent refractive index spectrum of the resultant radiation; and measuring an optical anisotropy of the birefringent refractive index spectrum.

14. The method of claim 1, further comprising, using a near-field nano-imaging configuration:

imaging a propagation of waveguide modes of the resultant radiation in real space; and identifying a conditions for phase-matched components in optical geometries.

15. The method of claim 1, wherein the measurement of the coherence length includes measuring a non-linear coherence length of the resultant radiation.

16. The method of claim 1, wherein the at least one TMD crystal includes at least one flake, and further comprising detecting and mapping the resultant radiation which is fundamental wave-length (FW) emission and a second harmonic (SH) emission from an opposite edge of the flake within a field of view.

17. The method of claim 1, wherein the second order non-linearity includes at least one of a difference frequency, a second harmonic generation (SHG), or spontaneous parametric down conversion.

* * * * *